US011457434B2

(12) United States Patent
Ying et al.

(10) Patent No.: US 11,457,434 B2
(45) Date of Patent: Sep. 27, 2022

(54) USER EQUIPMENTS, BASE STATIONS AND METHODS FOR TIME-DOMAIN RESOURCE ALLOCATION

(71) Applicants: Sharp Laboratories of America, Inc., Vancouver, WA (US); FG Innovation Company Limited, New Territories, Hong Kong (CN)

(72) Inventors: Kai Ying, Vancouver, WA (US); Tatsushi Aiba, Vancouver, WA (US); John Michael Kowalski, Vancouver, WA (US); Kazunari Yokomakura, Vancouver, WA (US)

(73) Assignees: Sharp Laboratories of America, Inc., Vancouver, WA (US); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 16/448,701

(22) Filed: Jun. 21, 2019

(65) Prior Publication Data

US 2019/0394759 A1 Dec. 26, 2019

Related U.S. Application Data

(63) Continuation of application No. PCT/US2019/038324, filed on Jun. 20, 2019.
(Continued)

(51) Int. Cl.
*H04W 72/04* (2009.01)
*H04W 76/11* (2018.01)
(Continued)

(52) U.S. Cl.
CPC ......... *H04W 72/042* (2013.01); *H04L 1/0061* (2013.01); *H04W 72/0446* (2013.01);
(Continued)

(58) Field of Classification Search
None
See application file for complete search history.

(56) References Cited

U.S. PATENT DOCUMENTS 9,985,764 B2   5/2018  Aiba et al.
10,645,701 B2 * 5/2020  Baldemair ........ H04W 72/0493
(Continued)

OTHER PUBLICATIONS

3GPP TS 38.211 v15.1.0 (Mar. 2018). 3rd Generation Partnership Project; Technical Specification Group Radio Access Network; NR; Physical channels and modulation.*
(Continued)

*Primary Examiner* — Jae Y Lee
(74) *Attorney, Agent, or Firm* — Austin Rapp

(57) ABSTRACT

A user equipment (UE) is described. The UE includes receiving circuitry configured to receive a radio resource control (RRC) message comprising a first parameter(s) used for configuring a first allocation table and a second allocation table. Each of the first allocation table and the second allocation table are used for defining a time domain allocation for a physical uplink shared channel (PUSCH) transmission. The receiving circuitry is also configured to detect in a UE specific search space, a downlink control information (DCI) format comprising first information used for indicating a row index to the first allocation table or the second allocation table. The DCI format is used for scheduling of the PUSCH. The UE also includes transmitting circuitry configured to perform, based on a detection of the DCI format, the PUSCH transmission based on either of the first allocation table or the second allocation table.

4 Claims, 18 Drawing Sheets

Related U.S. Application Data

(60) Provisional application No. 62/688,880, filed on Jun. 22, 2018.

(51) Int. Cl.
  *H04W 76/27* (2018.01)
  *H04L 1/00* (2006.01)
  *H04W 80/08* (2009.01)

(52) U.S. Cl.
  CPC ........ *H04W 72/0466* (2013.01); *H04W 76/11* (2018.02); *H04W 76/27* (2018.02); *H04W 80/08* (2013.01)

(56) References Cited

U.S. PATENT DOCUMENTS

| | | | |
|---|---|---|---|
| 2014/0071902 A1* | 3/2014 | Sorrentino | H04W 52/325 370/329 |
| 2014/0286255 A1* | 9/2014 | Nam | H04L 27/2613 370/329 |
| 2015/0003311 A1* | 1/2015 | Feuersaenger | H04W 52/0216 370/311 |
| 2015/0016310 A1* | 1/2015 | Yi | H04L 5/0053 370/277 |
| 2015/0215097 A1* | 7/2015 | Yi | H04L 1/1829 370/329 |
| 2015/0245347 A1* | 8/2015 | Yi | H04W 72/0446 370/280 |
| 2015/0289237 A1* | 10/2015 | Kim | H04L 5/0094 370/329 |
| 2015/0296533 A1* | 10/2015 | Park | H04L 5/0092 370/329 |
| 2015/0327315 A1* | 11/2015 | Xue | H04L 5/0005 370/330 |
| 2016/0057784 A1* | 2/2016 | You | H04W 88/04 370/329 |
| 2016/0127918 A1* | 5/2016 | Yi | H04W 16/26 370/329 |
| 2016/0227486 A1* | 8/2016 | Park | H04W 72/042 |
| 2017/0202009 A1* | 7/2017 | Kim | H04W 28/0278 |
| 2017/0295601 A1 | 10/2017 | Kim et al. | |
| 2017/0331595 A1 | 11/2017 | Rudolf et al. | |
| 2017/0332399 A1* | 11/2017 | Yi | H04W 76/10 |
| 2018/0027535 A1* | 1/2018 | Guo | H04W 72/0473 370/329 |
| 2018/0206263 A1* | 7/2018 | Lin | H04W 72/1278 |
| 2019/0215781 A1* | 7/2019 | Jeon | H04W 76/32 |
| 2019/0253986 A1* | 8/2019 | Jeon | H04B 7/0695 |
| 2019/0327012 A1* | 10/2019 | Park | H04W 24/08 |
| 2020/0106550 A1* | 4/2020 | Yoshimoto | H04L 1/0026 |
| 2020/0136787 A1* | 4/2020 | Reial | H04L 5/0057 |
| 2020/0196332 A1* | 6/2020 | Yokomakura | H04W 72/12 |

OTHER PUBLICATIONS

3GPP TS 38.214 v15.1.0 (Mar. 2018). 3rd Generation Partnership Project; Technical Specification Group Radio Access Network; NR; Physical layer procedures for data.*

"5G NR: PDSCH Resource Allocation in Time-Domain." How LTE Stuff Works? <http://howltestuffworks.blogspot.com/2019/12/5g-nr-pdsch-resource-allocation-in-time.html>, Jul. 10, 2020.*

ShareTechnote, "5G/NR—PUSCH." Jun. 18, 2018 <https://web.archive.org/web/20180618031606/http://www.sharetechnote.com/html/5G/5G_PUSCH.html>.*

3GPP TS 38.213 V15.1.0, "NR; Physical layer procedures for control (Release 15)," Mar. 2018.

3GPP TS 38.214 V15.1.0, "NR; Physical layer procedures for data (Release 15)," Mar. 2018.

3GPP TS 38.212 V15.1.0, "NR; Multiplexing and channel coding (Release 15)," Mar. 2018.

3GPP TS 38.211 V15.1.0, "NR; Physical channels and modulation (Release 15)," Mar. 2018.

NTT DOCOMO, Samsung, Panasonic, KDDI, OPPO, Ericsson, CATT, AT&T, vivo, Nokia, NSB, NTT, Sharp, ZTE, LGE, "WF on PUSCH time-domain resource allocation," 3GPP TSG RAN WG1 Meeting 93, Busan, Korea, R1-1807886 May 25, 2018.

International Search Report and Written Opinion issued for PCT Application No. PCT/US2019/038324 dated Sep. 30, 2019.

* cited by examiner

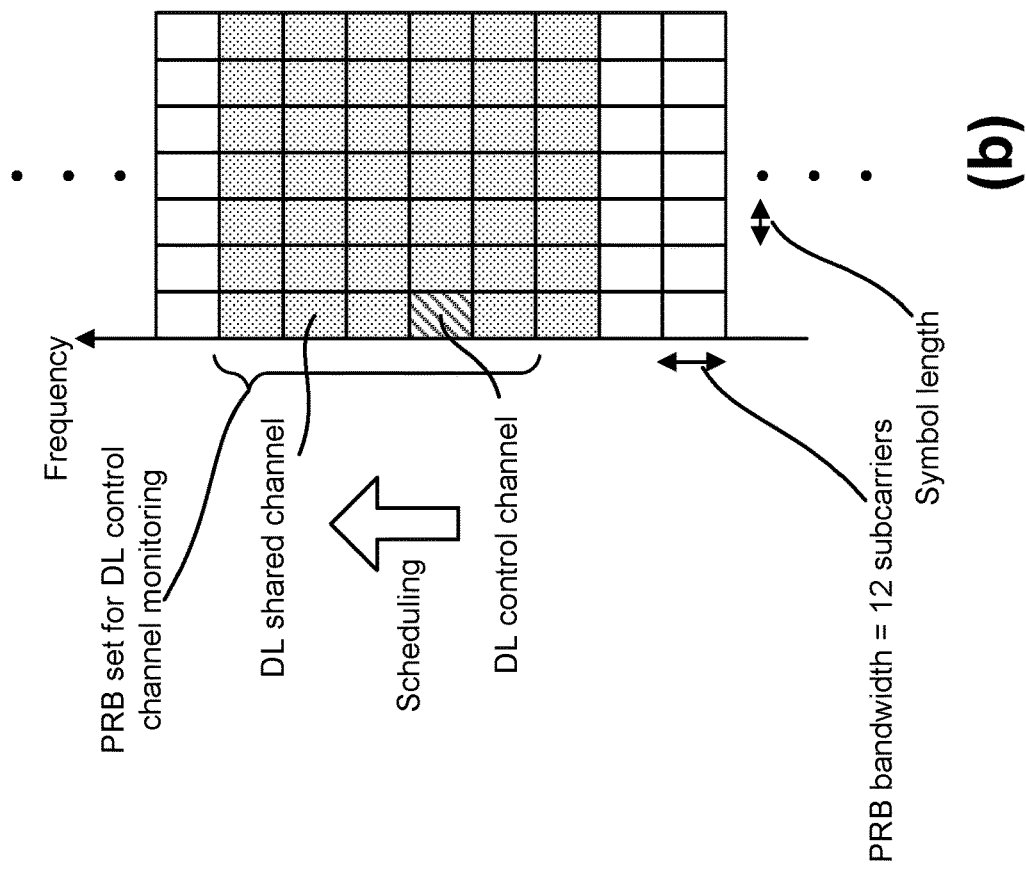
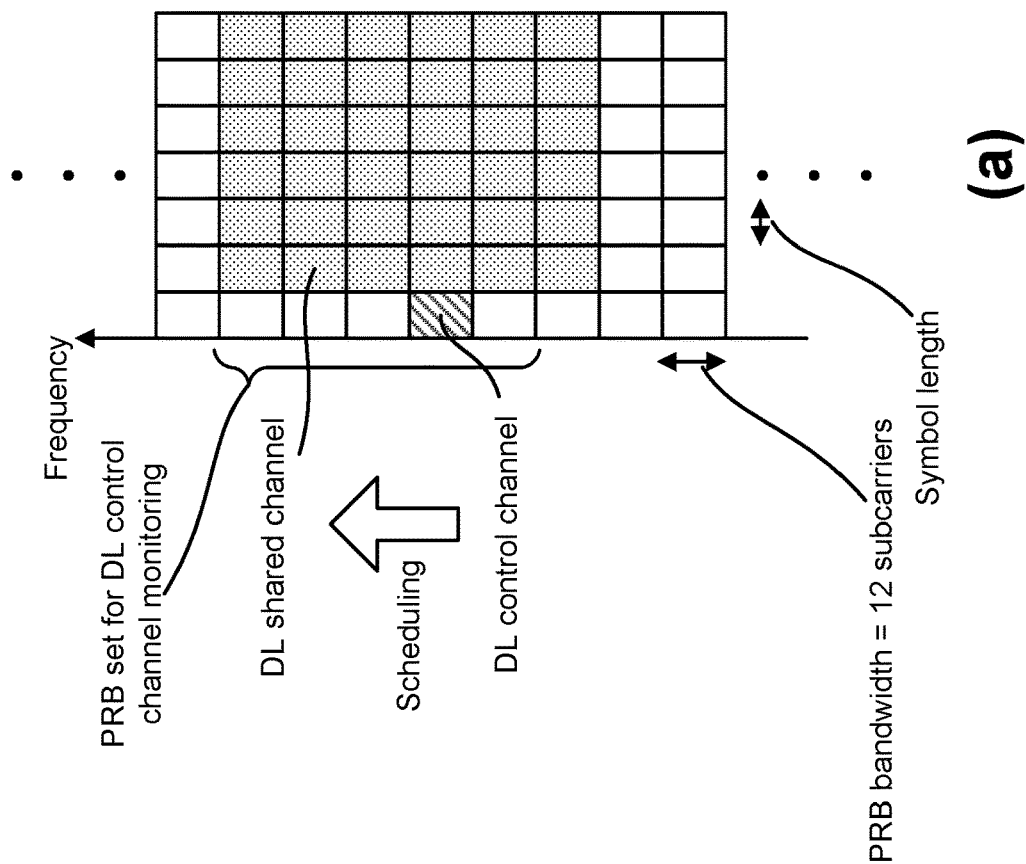
FIG. 8

USER EQUIPMENTS, BASE STATIONS AND METHODS FOR TIME-DOMAIN RESOURCE ALLOCATION

RELATED APPLICATIONS

This application is related to and claims priority from U.S. Provisional Patent Application No. 62/688,880, entitled "USER EQUIPMENTS, BASE STATIONS AND METHODS FOR TIME-DOMAIN RESOURCE ALLOCATION," filed on Jun. 22, 2018, which is hereby incorporated by reference herein, in its entirety.

TECHNICAL FIELD

The present disclosure relates generally to communication systems. More specifically, the present disclosure relates to user equipments, base stations and methods for time-domain resource allocation.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 8 shows examples of downlink (DL) control channel monitoring regions;

DETAILED DESCRIPTION

Figure 1:
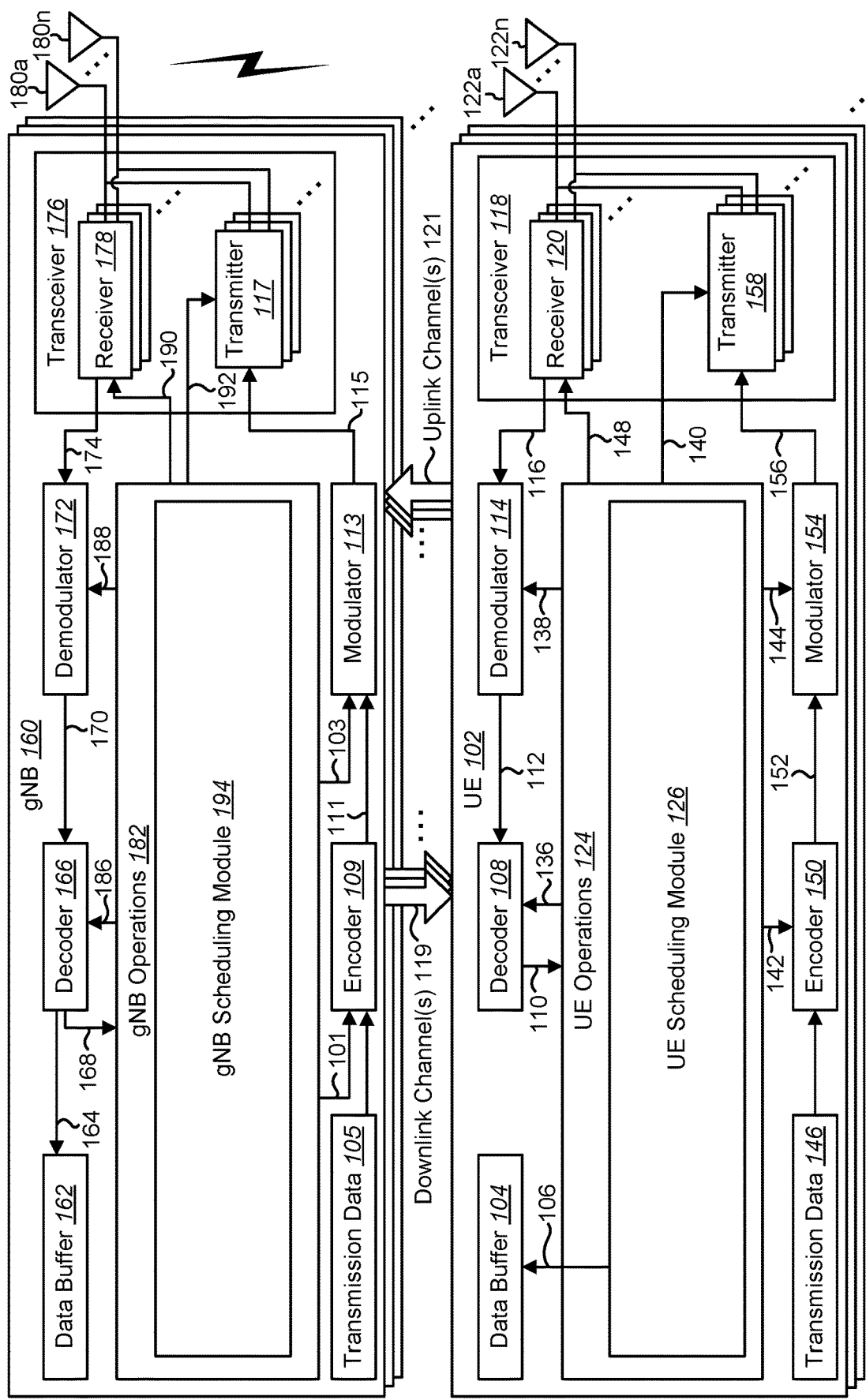
FIG. 1 is a block diagram illustrating one implementation of one or more base stations (gNBs) and one or more user equipments (UEs) in which systems and methods for time-domain resource allocation may be implemented.

A user equipment (UE) is described. The UE includes receiving circuitry configured to receive a radio resource control (RRC) message comprising a first parameter(s) used for configuring a first allocation table and a second allocation table. Each of the first allocation table and the second allocation table are used for defining a time domain allocation for a physical uplink shared channel (PUSCH) transmission. The receiving circuitry is also configured to detect in a UE specific search space, a downlink control information (DCI) format comprising first information used for indicating a row index to the first allocation table or the second allocation table. The DCI format is used for scheduling of the PUSCH. The UE also includes transmitting circuitry configured to perform, based on a detection of the DCI format, the PUSCH transmission based on either of the first allocation table or the second allocation table. Whether the first allocation table or the second allocation table is used for the PUSCH transmission is determined based on a radio network temporary identifier (RNTI) used for scrambling of cyclic redundancy check (CRC) for the DCI format.

Whether the first allocation table or the second allocation table is used for the PUSCH transmission may also be determined based on a value of second information comprised in the DCI format. The receiving circuitry may also be configured to receive a RRC message comprising a second parameter(s) used for configuring whether or not the second information is present in the DCI format.

A base station apparatus is also described. The base station includes transmitting circuitry configured to transmit a radio resource control (RRC) message comprising a first parameter(s) used for configuring a first allocation table and a second allocation table. Each of the first allocation table and the second allocation table are used for defining a time domain allocation for a physical uplink shared channel (PUSCH) transmission. The transmitting circuitry is also configured to transmit in a UE specific search space, a downlink control information (DCI) format comprising first information used for indicating a row index to the first allocation table or the second allocation table. The DCI format is used for scheduling of the PUSCH. The base station also includes receiving circuitry configured to receive the PUSCH transmission based on either of the first allocation table or the second allocation table. Whether the first allocation table or the second allocation table is used for the PUSCH transmission is determined based on a radio network temporary identifier (RNTI) used for scrambling of cyclic redundancy check (CRC) for the DCI format.

Whether the first allocation table or the second allocation table is used for the PUSCH transmission may further be determined based on a value of second information comprised in the DCI format. The transmitting circuitry may also be configured to transmit a RRC message comprising a second parameter(s) used for configuring whether or not the second information is present in the DCI format.

A communication method of a user equipment (UE) is also described. The communication method includes receiving a radio resource control (RRC) message comprising a first parameter(s) used for configuring a first allocation table and a second allocation table. Each of the first allocation table and the second allocation table is used for defining a time domain allocation for a physical uplink shared channel (PUSCH) transmission. The communication method also includes detecting in a UE specific search space, a downlink control information (DCI) format comprising first information used for indicating a row index to the first allocation table or the second allocation table. The DCI format is used for scheduling of the PUSCH. The communication method also includes performing, based on a detection of the DCI format, the PUSCH transmission based on either of the first allocation table or the second allocation table. Whether the first allocation table or the second allocation table is used for the PUSCH transmission is determined based on a radio network temporary identifier (RNTI) used for scrambling of cyclic redundancy check (CRC) for the DCI format.

Whether the first allocation table or the second allocation table is used for the PUSCH transmission may further be determined based on a value of second information comprised in the DCI format.

The RRC message received may further comprise a second parameter(s) that may be used for configuring whether or not the second information is present in the DCI format.

A communication method of a base station apparatus is also described. The communication method includes transmitting a radio resource control (RRC) message comprising a first parameter(s) used for configuring a first allocation table and a second allocation table. Each of the first allocation table and the second allocation table are used for defining a time domain allocation for a physical uplink shared channel (PUSCH) transmission. The communication method also includes transmitting in a UE specific search space, a downlink control information (DCI) format comprising first information used for indicating a row index to the first allocation table or the second allocation table. The DCI format is used for scheduling of the PUSCH. The communication method also includes receiving the PUSCH transmission based on either of the first allocation table or the second allocation table. Whether the first allocation table or the second allocation table is used for the PUSCH transmission is determined based on a radio network temporary identifier (RNTI) used for scrambling of cyclic redundancy check (CRC) for the DCI format.

Whether the first allocation table or the second allocation table is used for the PUSCH transmission may further be determined based on a value of second information comprised in the DCI format.

The RRC message transmitted may further comprise a second parameter(s) that may be used for configuring whether or not the second information is present in the DCI format.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

To meet the latency requirement and flexible scheduling, a mini-slot whose length can be less than 14 OFDM symbols (e.g., 2 symbols, 3 symbols, 7 symbols, and/or 10 symbols) is used for transmissions (e.g., downlink (the PDCCH and/or the PDSCH) transmissions and/or uplink (the PUSCH and/or the PUCCH) transmissions). Start position of the mini-slot and/or length of the mini-slot may be indicated by using a time-domain resource allocation (RA) field. Here, the time-domain RA field may be included in downlink control information (DCI) (e.g., a DCI format(s)) and/or radio resource control (RRC) configuration (e.g., RRC message(s) (i.e., RRC signal)). Here, the RRC configuration (i.e., configuration(s) included in the RRC message) may be transmitted on the PDSCH (e.g., for downlink) and/or PUSCH (e.g., for uplink). For example, the number of bits (e.g., the bit width, the size) of the time-domain RA field may be 4, so that the resolution (i.e., granularity) of RA may not be high enough to satisfy various operations. The systems and methods described herein provide approaches to increase the number of bits of the time-domain RA field.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for time-domain resource allocation may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may be UL-SCH data. Also, UL data may include URLLC data. Namely, the URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 (e.g., the PUSCH and/or the PUCCH) may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform time-domain resource allocation. Approaches to increase the resolution (i.e., the granularity) of time-domain resource allocation (RA) for all channels are described herein.

In NR, to meet the latency requirement and flexible scheduling, a mini-slot whose length can be less than 14 OFDM symbols (e.g., 2 symbols, 3 symbols, 7 symbols, and/or 10 symbols) is used for the transmissions. A field named Time domain resource assignment may be used to indicate time-domain resource allocation of a slot(s) and/or a mini-slot(s). It should be noted that this field may have a different name in the specifications relating to, for example, resource allocation (RA). For example, the Time domain resource assignment field value m may provide (e.g., be used for indicating) a row index m+1 to an allocation table. The determination of the used resource allocation table may be as defined based on some rules. The indexed row may define a value(s) of the slot offset(s) and/or the mini-slot offset(s) (e.g., $K_0$ for downlink, and/or $K_2$ for uplink). Also, the indexed row may define the start and length indicator (SLIV), or may directly indicate the start symbol S and the allocation length L. Also, the indexed row may define a value(s) of the PDSCH mapping and/or the PUSCH mapping type to be assumed in the PDSCH/PUSCH reception. For example, the Time domain resource assignment field may be used to indicate, at least, a time domain relation between the PDCCH and the PDSCH (e.g., $K_0$ and/or a position(s) of the slot(s), the mini-slot(s), and/or the symbols(s) for the PDSCH scheduled by using the corresponding PDCCH), or a time domain relation between the PDCCH and the PUSCH (e.g., $K_2$ and/or a position(s) of the slot(s), the mini-slot(s), and/or the symbols(s) for the PUSCH scheduled by using the corresponding PDCCH), or a time domain relation between a reference point (e.g., period boundary, slot boundary, subframe boundary, system frame number (SFN)=0, etc.) and PUSCH/PDSCH. $K_0$ may denote delay between DL grant (PDCCH, DCI) and corresponding DL data (PDSCH) reception. $K_2$ may denote delay between UL grant (PDCCH, DCI) reception in DL and corresponding UL data (PUSCH) transmission. Note that $K_0$ and $K_2$ above may be defined in units of slots.

The Time domain resource assignment field may be included in downlink control information (DCI) used for uplink (UL) grant and/or downlink (DL) assignment. Namely, the Time domain resource assignment field may be included in a DCI format(s) (e.g., the DCI format 0_0 and/or the DCI format 0_1) that is used for scheduling of the PUSCH. Also, the Time domain resource assignment field may be included in a DCI format(s) (e.g., the DCI format 1_0 and/or the DCI format 1_1) that is used for scheduling of the PDSCH. The Time domain resource assignment field may also be included in DCI (e.g., the DCI format 0_0, the DCI format 1_0) used for activation of configured grant type 2. The Time domain resource assignment field may also be included in DCI (e.g., the DCI format 1_0, the DCI format 1_1) used for activation of DL semi-persistent scheduling (SPS). The Time domain resource assignment field (a different name may be used, e.g., timeDomainAllocation) may be included in radio resource control (RRC) signaling for configured grant type 1.

The network may indicate in the downlink/uplink (DL/UL) assignment which of the configured time domain allocations (e.g., allocation table) the UE 102 may apply for that DL/UL assignment. There may be several defaulted allocation table(s) specified in the specifications. Here, for example, the default allocation table(s) may be defined only for the 4-bit Time domain resource assignment field. Namely, the default allocation table(s) may have 16 entities. And, the default allocation table(s) may not be defined for the more than 4-bit Time domain resource assignment field. Namely, in a case of a condition(s) that the default allocation table is used, the 4-bit Time domain resource assignment field is always used for time-domain RA (e.g., for the downlink, and/or for the uplink). The allocation table may be configured by using information included in the RRC message. Some examples are shown in the following listings. Listing (1) illustrates an example of a PUSCH-TimeDomainResourceAllocation information element. Listing (2) illustrates an example of a PDSCH-TimeDomainResourceAllocationList information element.

| Listing-1 |
|---|
| -- ASN1START<br>-- TAG-PUSCH-TIMEDOMAINRESOURCEALLOCATIONLIST-START<br>PUSCH-TimeDomainResourceAllocationList ::=  SEQUENCE (SIZE(1..maxNrofUL-Allocations)) OF PUSCH-TimeDomainResourceAllocation<br>PUSCH-TimeDomainResourceAllocation ::=  SEQUENCE {<br>    k2                          INTEGER(0..32)<br>        OPTIONAL,  -- Need S<br>    mappingType          ENUMERATED {typeA, typeB},<br>    startSymbolAndLength  INTEGER (0..127)<br>}<br>-- TAG-PUSCH-TIMEDOMAINRESOURCEALLOCATIONLIST-STOP<br>-- ASN1STOP |

| Listing-2 |
|---|
| -- ASN1START<br>-- TAG-PDSCH-TIMEDOMAINRESOURCEALLOCATIONLIST-START<br>PDSCH-TimeDomainResourceAllocationList ::=  SEQUENCE (SIZE(1..maxNrofDL-Allocations)) OF PDSCH-TimeDomainResourceAllocation<br>PDSCH-TimeDomainResourceAllocation ::=  SEQUENCE {<br>    k0                          INTEGER(0..32)<br>        OPTIONAL,  -- Need S<br>    mappingType          ENUMERATED {typeA, typeB},<br>    startSymbolAndLength  INTEGER (0..127)<br>}<br>-- TAG-PDSCH-TIMEDOMAINRESOURCEALLOCATIONLIST-STOP<br>-- ASN1STOP |

The UE 102 may determine the number of bits (e.g., the bit width, the size) of the Time domain resource assignment field based on the number of entries in the allocation table. As described above, the number of entries may be determined (e.g., configured) based on the information included in the RRC message. The maximum number of entries in the configured allocation table (e.g., maxNrofUL-Allocations or maxNrofDL-Allocations) may be set as 16. The maximum number of entries in the defaulted allocation table(s) may be 16. In this case, the number of bits (e.g., the maximum number of bits) of the Time domain resource assignment field may be 4. For example, the number of bits of the Time domain resource assignment field in a fallback DCI (e.g., the DCI Format 0_0, or the DCI Format 1_0) may be 4. The number of bits of the Time domain resource assignment field in non-fallback DCI (e.g., the DCI Format 0_1, or the DCI Format 1_1) may be 0, 1, 2, 3, or 4.

Here, 16 entries (i.e., 16 time domain allocations) in the allocation table may not be enough to meet the flexible scheduling or other requirements. Thus, in a different design, an allocation table with more than 16 entries may be configured by using information included in the RRC message. Namely, the number of entries (e.g., the maximum number of entries) in the configured allocation table (e.g., maxNrofUL-Allocations1 or maxNrofDL-Allocations1) may be set greater than 16. And/or, one or more defaulted allocation tables with more than 16 entries may be defined in the specifications. In this case, more than 4 bits may be needed for the Time domain resource assignment field. Namely, the UE 102 may need to identify 4-bit Time domain resource assignment field and/or more than 4-bit Time domain resource assignment field (e.g., 6-bit Time domain resource assignment field).

A first aspect of the time-domain resource allocation described herein is how to increase the number of bits in the time-domain RA field. To increase the resolution (i.e., the granularity) of RA (e.g., to provide more choices of RA), the length of the field may be increased from 4 bits to 5, 6, or more bits. Some approaches to increase the length of the time-domain RA field to 5, 6, or more bits are described.

In a first approach (1a), a new DCI format(s) (e.g., DCI format A used for scheduling of the PDSCH, which is different from the DCI format 1_0 and the DCI format 1_1, and/or DCI format B used for scheduling of the PUSCH, which is different from the DCI format 0_0 and the DCI format 0_1) may be defined. In this approach, a new DCI format(s) may be introduced so that it can include more than 4-bit time-domain RA field.

In a second approach (1b), a remaining bit(s) (e.g., a remaining field(s)) and/or a reserved bit(s) (e.g., a reserved field(s)) in the existing DCI format(s) (e.g., the DCI format 1_0, the DCI format 1_1, the DCI format 0_0, and/or the DCI format 0_1) may be used (e.g., used for defining more than 4-bit Time domain resource assignment field). In this approach, the number of bits of the time-domain RA field can be increased by using the remaining bit(s) and/or the reserved bit(s) in the existing DCI format to the time-domain RA.

In a third approach (1c), other field(s) in the existing DCI format may be reused or re-interpreted. In this approach, the number of bits of the time-domain RA field can be increased by reusing/re-interpreting other field(s) in the existing DCI format(s). For example, one bit of the new data indicator (NDI) field may be used to the RA field so that the number of bits of RA field is increased to 5 bits, or, two bits of the redundancy version (RV) field may be used to the RA field so that the number of bits of the time-domain RA field is increased. Any bit(s) of any field(s), such as modulation and coding scheme (MCS), resource block (RB) assignment, transmission power control (TPC) command for PUCCH, antenna port(s), scrambling identity, the number of layers, sounding reference signals (SRS) request, PDSCH resource element (RE) mapping, PDSCH start position, quasi-co-location, HARQ-ACK resource offset, interference presence, HARQ process number, PDSCH timing offset, and/or HARQ timing offset, etc., can be used to the time-domain RA so that the number of bits of the time-domain RA field can be increased.

For example, a frequency domain resource assignment field included in the DCI format 1_0 and/or the DCI format 1_1 may be used to the time domain RA field for indicating time domain RA for the downlink transmissions (e.g., indicating the row index of the allocation table for the downlink). Also, a frequency domain resource assignment field included in the DCI format 0_0 and/or the DCI format 0_0 may be used to the time domain RA field for indicating time domain RA for the uplink transmissions (e.g., indicating the row index of the allocation table for the uplink). Namely, the number of bits of the frequency domain resource assignment field may be reduced (e.g., the granularity of the frequency domain resource assignment may be reduced) so that the number of bits of the time domain resource assignment field can be increased (e.g., the granularity of the time domain resource assignment can be increased).

The number of bits for the frequency domain resource assignment field may be determined based on the size of bandwidth part (BWP) such as the initial (active) BWP, default BWP, and initial BWP, and may be also determined based on the size of the DL BWP and/or UL BWP. For example, when the number of bits for the time domain resource is determined, the granularity of the frequency domain resource assignment may be determined. The granularity of the frequency domain resource assignment may be configured by RRC and HighResolutionTimeDomainRA may include the granularity of the frequency domain resource assignment. the granularity of the frequency domain resource assignment may be defined in the specification and the UE may select or determine the granularity of the frequency domain resource assignment according to the RRC message such as HighResolutionTimeDomainRA. The granularity of the frequency domain resource assignment may be defined in terms of the number of PRBs, and/or the number of subcarriers. The granularity of the frequency domain resource assignment may be defined in terms of the number of OFDM symbols or DFT-S-OFDM symbols. If transmit precoding is disabled, a OFDM symbol may be generated. If the transmit precoding is enabled, DFT-S-OFDM symbol may be generated. Alternately, when the higher layer signaling, e.g., HighResolutionTimeDomainRA, is configured, the granularity of the frequency domain resource assignment is determined based on the configured value of deterministic/predefined value, and the granularity of the frequency domain resource assignment may be determined. The DCI size may be aligned with DCI format 1_0 and/or the DCI format 1_1 by inserting "0" and/or "1" (padding).

A second aspect of the time-domain resource allocation described herein is how to indicate the increased resolution (i.e., the granularity) of time-domain RA (e.g., the switching of the 4-bit Time domain resource assignment field and the more than 4-bit Time domain resource assignment field). The UE 102 may need to recognize whether an allocation table with more than 16 entries and/or a Time domain resource assignment field with more than 4 bits is applied or not. Some approaches to indicate an enlarged allocation table and/or an enlarged Time domain resource assignment field are described.

In a first approach (2a), the increased resolution (e.g., the granularity) of the time-domain RA may be configured explicitly by RRC. For example, the increasing of the number of bits of the Time domain resource assignment field (e.g., from 4 bits to 6 bits) may be indicated by using the RRC message. In other words, whether or not to apply an enlarged allocation table (e.g., a table with more than 16 entries) and/or an enlarged Time domain resource assignment field (e.g., 6-bit field) may be configured by using the RRC message. There may be an RRC parameter HighResolutionTimeDomainRA. If it is configured, enlarged time-domain RA field with increased number of bits may be applied for related channel(s) (e.g., PDSCH and/or PUSCH). For example, the RRC parameter HighResolutionTimeDomainRA may be separately defined for the PDSCH and the PUSCH. Namely, in a case that the RRC parameter HighResolutionTimeDomainRA is configured for the PDSCH, the number of bits of the Time domain resource assignment field included in the DCI format(s) (e.g., the DCI format 1_0 and/or the DCI format 1_1) that is used for scheduling of the PDSCH may be increased (e.g., from 4 bits to 6 bits). Also, in a case that the RRC parameter HighResolutionTimeDomainRA is configured for the PUSCH, the number of bits of the Time domain resource assignment field included in the DCI format(s) (e.g., the DCI format 0_0 and/or the DCI format 0_1) that is used for scheduling of the PUSCH may be increased (e.g., from 4 bits to 6 bits). In a case that the RRC parameter HighResolutionTimeDomainRA is not configured for the PDSCH, the number of bits of the Time domain resource assignment field included in the DCI format(s) (e.g., the DCI format 1_0 and/or the DCI format 1_1) that is used for scheduling of the PDSCH may not be increased (e.g., remain 4 bits). Also, in a case that the RRC parameter HighResolutionTimeDomainRA is not configured for the PUSCH, the number of bits of the Time domain resource assignment field included in the DCI format(s) (e.g., the DCI format 0_0 and/or the DCI format 0_1) that is used for scheduling of the PUSCH may not be increased (e.g., remain 4 bits).

In a second approach (2b), the increased resolution (e.g., the granularity) of time-domain RA may be indicated implicitly by using a separate/enlarged resource allocation table. In other words, the number of bits in the enlarged time domain resource assignment field may be indicated implicitly by using the separate/enlarged resource allocation table used for the increased resolution of time-domain RA. The enlarged time-domain RA field with an increased number of bits may correspond to an enlarged/separate resource allocation table. For example, a 6-bit RA field can be mapped to a RA table with up to 64 rows. If the enlarged/separate resource allocation table is configured, the time-domain RA field with increased number of bits may be indicated implicitly to be applied. For example, the resource allocation table (e.g., first allocation table) for the 4-bit time domain resource assignment field may be defined. Also, the resource allocation table (e.g., second allocation table, the enlarged/separate resource allocation table) for the more than 4-bit time domain resource assignment field may be defined. And, the gNB 160 may transmit the RRC message comprising a parameter used for indicating which resource allocation table (i.e., the first allocation table or the second allocation table) is used for time-domain RA. Here, the parameter may be commonly configured for the PDSCH and the PUSCH. Namely, in a case that the parameter indicates that the first allocation table is used, the 4-bit time domain resource assignment field is used for the DCI format(s) used for scheduling of the PDSCH and the DCI format(s) used for scheduling of the PUSCH. Also, in a case that the parameter indicates that the second allocation table is used, the more than 4-bit time domain resource assignment field is used for the DCI format(s) used for scheduling of the PDSCH and the DCI format(s) used for scheduling of the PUSCH. Also, the parameter may be separately configured for the PDSCH and the PUSCH. Namely, in a case that the parameter indicates that the first allocation table is used for the PDSCH, the 4-bit time domain resource assignment field is used for the DCI format(s) used for scheduling of the PDSCH. Also, in a case that the parameter indicates that the second allocation table is used for the PDSCH, the more than 4-bit time domain resource assignment field is used for the DCI format(s) used for scheduling of the PDSCH. Also, in a case that the parameter indicates that the first allocation table is used for the PUSCH, the 4-bit time domain resource assignment field is used for the DCI format(s) used for scheduling of the PUSCH. Also, in a case that the parameter indicates that the second allocation table is used for the PDSCH, the more than 4-bit time domain resource assignment field is used for the DCI format(s) used for scheduling of the PUSCH.

In a third approach (2c), the increased resolution (e.g., the granularity) of time-domain RA may be indicated by a different DCI format. A normal time-domain RA field and an enlarged time-domain RA field with increased number of bits may be differentiated by different DCI formats. For example, if a new DCI format designed for the increased resolution of time-domain RA (as described in approach 1a) is received by the UE 102, the UE 102 may know that the time-domain RA field in the DCI is the enlarged one with an increased number of bits. For example, a DCI format(s) A that is used for scheduling of the PDSCH may be defined. Here, the DCI format(s) A may be different from the DCI format 1_0 and the DCI format 1_1. Also, a DCI format(s) B that is used for scheduling of the PUSCH may be defined. Here, the DCI format(s) B may be different from the DCI format 0_0 and the DCI format 0_1. And, in a case that the UE 102 detects the DCI format(s) A, the UE 102 may assume the more than 4-bit time domain resource assignment field (and/or corresponding allocation table) is used for time-domain RA for the downlink (e.g., the PDSCH). Also, in a case that the UE 102 detects the DCI format(s) B, the UE 102 may assume the more than 4-bit time domain resource assignment field (and/or corresponding allocation table) is used for time-domain RA for the uplink (e.g., the PUSCH). Here, for example, in a case that the UE 102 detects the DCI format(s) 1_0 and/or the DCI format 1_1, the UE 102 may assume the 4-bit time domain resource assignment field is used for time-domain RA for the downlink (the PDSCH). Also, for example, in a case that the UE 102 detects the DCI format(s) 0_0 and/or the DCI format 0_1, the UE 102 may assume the 4-bit time domain resource assignment field is used for time-domain RA for the uplink (the PUSCH).

In a fourth approach (2d), the increased resolution (e.g., the granularity) of time-domain RA may be indicated by a different Radio Network Temporary Identifier (RNTI). A normal time-domain RA field and an enlarged time-domain RA field with an increased number of bits can be differentiated by different RNTIs. For example, a new RNTI may be introduced for the enlarged time-domain RA field with increased number of bits. If a DCI with CRC scrambled by the new RNTI is received by the UE 102, the UE 102 may know that the time-domain RA field in the DCI is the enlarged one with an increased number of bits. For example, the gNB 160 may transmit the RRC message comprising a parameter used for configuring RNTI-A. Here, the RNTI-A may be different from C-RNTI, CS-RNTI, SI-RNTI, P-RNTI, RA-RNTI, and/or Temporary C-RNTI. Also, the RNTI-A may be used for the DCI format(s) (e.g., the DCI format(s) used for scheduling of the PDSCH, and/or the DCI format(s) used for scheduling of the PUSCH). And, in a case that the UE 102 detects the DCI format(s) with CRC scrambled by the RNTI-A, the UE 102 may assume the more than 4-bit time domain resource assignment field (and/or corresponding allocation table) is used for the DCI format(s). Namely, for example, in a case that the UE 102 detects the DCI format(s) with CRC scrambled by the C-RNTI, the UE 102 may assume the 4-bit time domain resource assignment field is used for the DCI format(s).

In a fifth approach (2e), the increased resolution (e.g., the granularity) of time-domain RA may be indicated by using a search space(s) (e.g., UE-specific search space(s), and/or common search space(s)). Here, the UE 102 may detect the DCI format(s) in the search space(s). Namely, the UE 102 may monitor the PDCCH in the search space(s) according to the DCI format(s). And, for the search space (e.g., a search space set), the gNB 160 may configure, by using the RRC message, the UE-specific search space or the common search space. Also, for the search space (e.g., a search space set), the gNB 160 may configure, by using the RRC message, the DCI format(s) (e.g., the DCI format A, the DCI format B, the DCI format 1_0, the DCI format 1_1, the DCI format 0_0, and/or the DCI format 0_1). Also, for the search space (e.g., a search space set), the gNB 160 may configure, by using the RRC message, a monitoring occasion(s) where the UE 102 monitors the PDCCH in the search spaces. Also, for the search space (e.g., a search space set), the gNB 160 may configure, by using the RRC message, RNTI(s) (e.g., the RNTI-A, the C-RNTI, the CS-RNTI, the SI-RNTI, the P-RNTI, the RA-RNTI, and/or the Temporary C-RNTI). And, the UE 102 may monitor the PDCCH based on the configuration(s) by the gNB 160. Also, the UE 102 may detect the DCI format(s) based on the configuration(s) by the gNB 160. Also, the UE 102 may identify, based on the configuration(s) by the gNB 160, that the 4-bit time domain resource assignment field is used for time-domain RA. Also, the UE 102 may identify, based on the configuration(s) by the gNB 160, that the more than 4-bit time domain resource assignment field (and/or corresponding allocation table) is used for time-domain RA. A normal time-domain RA field (e.g., the 4-bit time domain resource assignment field) and an enlarged time-domain RA field with an increased number of bits (e.g., the more than 4-bit time domain resource assignment field) may be differentiated by different search spaces (e.g., the configuration for the search space (e.g., the search space set)).

In a sixth approach (2f), the increased resolution of time-domain RA may be indicated a flag (e.g., one or more downlink control information) in the DCI (e.g., the DCI format 1_0, the DCI format 1_1, the DCI format 0_0, and/or the DCI format 0_0). The flag in the DCI may be used to indicate a normal time-domain RA field and an enlarged time-domain RA field with an increased number of bits. For example, if the flag in DCI is set as "1" (or "0"), the UE 102 may identify the time-domain RA field in the DCI is the enlarged one with an increased number of bits, otherwise, the UE 102 may identify the time-domain RA field in the DCI is the regular one with normal number of bits (e.g., 4 bits). Here, the flag may be included in only the DCI format 1_1, and/or the DCI format 0_1. Namely, the flag may not be included in DCI format 1_0 and/or the DCI format 0_1. Also, the gNB 160 may transmit the RRC message including a parameter used for indicating whether or not the flag is present (e.g., the parameter used for indicating a presence of the flag).

In a seventh approach (2g), the increased resolution of time-domain RA may be indicated by any combination of the above approaches (2a-2f).

A third aspect of the time-domain resource allocation described herein is determining when and where to apply the increased resolution of time-domain RA. The increased resolution of time-domain RA may not be applied to all kinds of channels or transmission if it is configured or indicated as described above.

In a first approach (3a), the increased resolution of time-domain RA (e.g., the more than 4-bits time domain resource assignment field) may be applied to uplink (UL) (e.g., the PUSCH, the DCI format(s) used for scheduling of the PUSCH) only, downlink (DL) only (e.g., the PDSCH, the DCI format(s) used for scheduling of the PDSCH), either, or both. For example, when an allocation table with more than 16 entries is configured by RRC, or a defaulted allocation table with more than 16 entries is indicated/applied/assumed, or a RRC parameter for indication of High Resolution Time Domain RA is configured, or a flag for indication of High Resolution Time Domain RA in DCI is set as true, or any approach (2a-2g) described above or any combination of approaches is used, it may be applied to DL only, UL only, or both DL and UL. Or, the table/parameter/flag may be configured/indicated/set separately for DL and UL. Therefore, the increased resolution of time-domain RA may be applied to UL only if it is indicated or configured by one or more of the approaches (2a-2g) described above in the second aspect. The increased resolution of time-domain RA may be applied to DL only if it is indicated or configured by one or more of the approaches (2a-2g) described above. The increased resolution of time-domain RA may be applied to both DL and UL if it is indicated or configured by one or more of the approaches (2a-2g) described above. Whether the increased resolution of time-domain RA is applied or not may be configured or indicated for UL and DL separately based on one or more of the approaches (2a-2g) described above.

In a second approach (3b), the increased resolution of time-domain RA may be applied to grant-based or SPS/grant-free (configured grant) (e.g., cell-radio network temporary identifier (C-RNTI) or configured scheduling RNTI (CS-RNTI)). For example, when an allocation table with more than 16 entries is configured by RRC, or a defaulted allocation table with more than 16 entries is indicated/applied/assumed, or a RRC parameter for indication of High Resolution Time Domain RA is configured, or a flag for indication of High Resolution Time Domain RA in DCI is set as true, or any approach (2a-2g) described above is used, it may be applied to DCI with CRC only scrambled by C-RNTI, DCI with CRC only scrambled by CS-RNTI, or both. Or, the table/parameter/flag may be configured/indicated/set separately for DCI with CRC scrambled by C-RNTI and DCI with CRC scrambled by CS-RNTI. Therefore, the increased resolution of time-domain RA may be applied to grant-based (e.g., DCI with CRC scrambled by C-RNTI) only if it is indicated or configured by one or more of the approaches (2a-2g) described above. The increased resolution of time-domain RA may be applied to SPS/grant-free (e.g., DCI with CRC scrambled by CS-RNTI) only if it is indicated or configured by one or more of the approaches (2a-2g) described above. The increased resolution of time-domain RA may be applied to both grant-based and SPS/grant-free if it is indicated or configured by one or more of the approaches (2a-2g) described above. Whether the increased resolution of time-domain RA is applied or not may be configured or indicated for grant-based and SPS/ grant-free separately based on one or more of the approaches (2a-2g) described above. There may be two types of grant-free UL transmissions (UL transmissions without grant, configured grants, PUSCH transmissions with configured grant). One is configured grant Type 1 and the other is configured grant Type 2. For Type 1 PUSCH transmissions with a configured grant, related parameters may be fully RRC-configured (configured by using RRC signalling). For example, parameters for resource allocation, such as time domain resource allocation (timeDomainOffset, timeDomainAllocation), frequency domain resource allocation (frequencyDomainAllocation), modulation and coding scheme (MCS, mcsAndTBS), the antenna port value, the bit value for DM-RS sequence initialization, precoding information and number of layers, SRS resource indicator (provided by antennaPort, dmrs-SeqInitialization, precodingAndNumberOfLayers, and srs-ResourceIndicator respectively), the frequency offset between two frequency hops (frequencyHoppingOffset), etc., are provided by RRC message (rrc-ConfiguredUplinkG rant). Activation (e.g., PDCCH, DCI activation) may not be used for Type 1 configured grant. Namely, for configured grant Type 1, an uplink grant is provided by RRC, and stored as configured uplink grant. The retransmission of configured grant type 1 may be scheduled by PDCCH with CRC scrambled by CS-RNTI (Configured Scheduling RNTI). For Type 2 PUSCH transmissions with a configured grant, the related parameters follow the higher layer configuration (e.g., periodicity, the number of repetitions, etc.), and UL grant received on the DCI addressed to CS-RNTI (PDCCH with CRC scrambled by CS-RNTI, L1 activation/reactivation). Namely, for configured grant Type 2, an uplink grant is provided by PDCCH, and stored or cleared as configured uplink grant based on L1 signalling indicating configured uplink grant activation or deactivation. The retransmission of configured grant type 2 may be scheduled by PDCCH with CRC scrambled by CS-RNTI. Namely, retransmissions except for repetition of configured uplink grants use uplink grants addressed to CS-RNTI. The UE 102 may not transmit anything on the resources configured for PUSCH transmissions with configured grant if the higher layers did not deliver a transport block to transmit on the resources allocated for uplink transmission without grant.

In a third approach (3c), the increased resolution of time-domain RA may be applied to a configured grant type 1 or type 2. For example, when an allocation table with more than 16 entries is configured by RRC, or a defaulted allocation table with more than 16 entries is indicated/applied/assumed, or a RRC parameter for indication of High Resolution Time Domain RA is configured, or a flag for indication of High Resolution Time Domain RA in DCI is set as true, or any approach (2a-2g) described above is used, it may be applied to configured grant type 1 only, configured grant type 2 only, or both. Or, the table/parameter/flag may be configured/indicated/set separately for configured grant type 1 and configured grant type 2. Therefore, the increased resolution of time-domain RA may be applied to a configured grant type 1 only if it is indicated or configured by one or more of the approaches (2a-2g) described above. The increased resolution of time-domain RA may be applied to configured grant type 2 only if it is indicated or configured by one or more of the approaches (2a-2g) described above. The increased resolution of time-domain RA may be applied to both configured grant type 1 and type 2 if it is indicated or configured by one or more of the approaches (2a-2g) described above. Whether the increased resolution of time-domain RA is applied or not may be configured or indicated for configured grant type 1 and type 2 separately based on one or more of the approaches (2a-2g) described above.

In a fourth approach (3d), the increased resolution (e.g., the granularity) of time-domain RA may be applied to fallback DCI (e.g., the DCI format 1_0, and/or the DCI format 0_0) or non-fallback DCI (e.g., the DCI format 1_1, and/or the DCI format 0_1). For example, in a case that the allocation table with more than 16 entries (e.g., second allocation table, the enlarged/separate resource allocation table) is configured by using the RRC message, or a defaulted allocation table with more than 16 entries is indicated/applied/assumed, or a RRC parameter for indication of High Resolution Time Domain RA is configured, or a flag for indication of High Resolution Time Domain RA in DCI is set as true, or any approach (2a-2g) described above is used, it may be applied to fallback DCI only, non-fallback DCI only, or both. Or, the table/parameter/flag may be configured/indicated/set separately for fallback DCI and non-fallback DCI. Therefore, the increased resolution of time-domain RA may be applied to non-fallback DCI only if it is indicated or configured by one or more of the approaches (2a-2g) described above. The increased resolution of time-domain RA may be applied to fallback DCI only if it is indicated or configured by one or more of the approaches (2a-2g) described above. The increased resolution of time-domain RA may be applied to both fallback DCI and non-fallback DCI if it is indicated or configured by one or more of the approaches (2a-2g) described above. Whether the increased resolution of time-domain RA is applied or not may be configured or indicated for fallback DCI and non-fallback DCI separately based on one or more of the approaches (2a-2g) described above.

In a fifth approach (3e), the increased resolution of time-domain RA may be applied to the C-RNTI and/or the Temporary C-RNTI (TC-RNTI (e.g., for retransmission of message 3)). Here, the Temporary C-RNTI may be used for indicating the retransmission of the message 3 (e.g., the PUSCH transmission, the UL-SCH transmission) in a random access procedure (e.g., a contention based random access procedure. For example, when an allocation table with more than 16 entries is configured by RRC, or a defaulted allocation table with more than 16 entries is indicated/applied/assumed, or a RRC parameter for indication of High Resolution Time Domain RA is configured, or a flag for indication of High Resolution Time Domain RA in DCI is set as true, or any approach (2a-2g) described above is used, it may be applied to DCI with CRC only scrambled by the C-RNTI, DCI with CRC only scrambled by the TC-RNTI, or both. Or, the table/parameter/flag may be configured/indicated/set separately for DCI with CRC scrambled by the C-RNTI and/or DCI with CRC scrambled by the TC-RNTI. Therefore, the increased resolution of time-domain RA may only be applied to DCI with CRC scrambled by the C-RNTI if it is indicated or configured by one or more of the approaches (2a-2g) described above. The increased resolution of time-domain RA may only be applied to DCI with CRC scrambled by the TC-RNTI if it is indicated or configured by one or more of the approaches (2a-2g) described above. The increased resolution of time-domain RA may be applied to both DCI with CRC scrambled by the TC-RNTI and DCI with CRC scrambled by the C-RNTI if it is indicated or configured by one or more of the approaches (2a-2g) described above. Whether the increased resolution of time-domain RA is applied or not may be configured or indicated for the C-RNTI and the TC-RNTI separately based on one or more of the approaches (2a-2g) described above.

In a sixth approach (3f), the increased resolution of time-domain RA may be applied to the common search space (CSS) associated with control resource set (CORESET) 0 or the CSS not associated with CORESET 0. Alternatively, the increased resolution of time-domain RA may be applied to the UE-specific search space. Namely, for example, the DCI format(s) including the more than 4-bit time domain resource may be detected only in the UE-specific search space. Here, the DCI format(s) including the 4-bit time domain resource may be detected in the UE-specific search space and/or the common search space. Also, the DCI format(s) detected in the UE-specific search space with CORESET 0 may be the DCI format(s) including the 4-bit time domain resource assignment field. Namely, the UE 102 may detect the DCI format(s) including the more than 4-bit time domain resource field in the UE-specific search space with CORESET X (e.g., X may be CORESET ID and may not be equal to "0"). Also, the UE 102 may detect the DCI format(s) including the 4-bit time domain resource field in the UE-specific search space with CORESET X (e.g., X may be CORESET ID and may be equal to "0"). Here, the gNB 160 may configure, by using the RRC message, the CORESET ID. Also, as described above, the gNB 160 may configured, by using the RRC message, the configuration for the search space (e.g., the search space set). For example, when an allocation table with more than 16 entries is configured by RRC, or a defaulted allocation table with more than 16 entries is indicated/applied/assumed, or a RRC parameter for indication of High Resolution Time Domain RA is configured, or a flag for indication of High Resolution Time Domain RA in DCI is set as true, or any approach (2a-2g) described above is used, it may be applied to only a CSS associated with CORESET 0, only a CSS not associated with CORESET 0, or both. Or, the table/parameter/flag should be configured/indicated/set separately for CSS associated with CORESET 0 and CSS not associated with CORESET 0. Therefore, the increased resolution of time-domain RA may only be applied to a CSS not associated with CORESET 0 if it is indicated or configured by one or more of the approaches (2a-2g) described above. The increased resolution of time-domain RA may only be applied to a CSS associated with CORESET 0 if it is indicated or configured by one or more of the approaches (2a-2g) described above. The increased resolution of time-domain RA may be applied to both a CSS not associated with CORESET 0 and a CSS associated with CORESET 0 if it is indicated or configured by one or more of the approaches (2a-2g) described above. Whether the increased resolution of time-domain RA is applied or not may be configured or indicated for a CSS associated with CORESET 0 and a CSS not associated with CORESET 0 separately based on one or more of the approaches (2a-2g) described above.

In a seventh approach (3g), the increased resolution of time-domain RA may be applied using any combination of the approaches (3a-3f) described herein.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ- ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform time-domain resource allocation as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
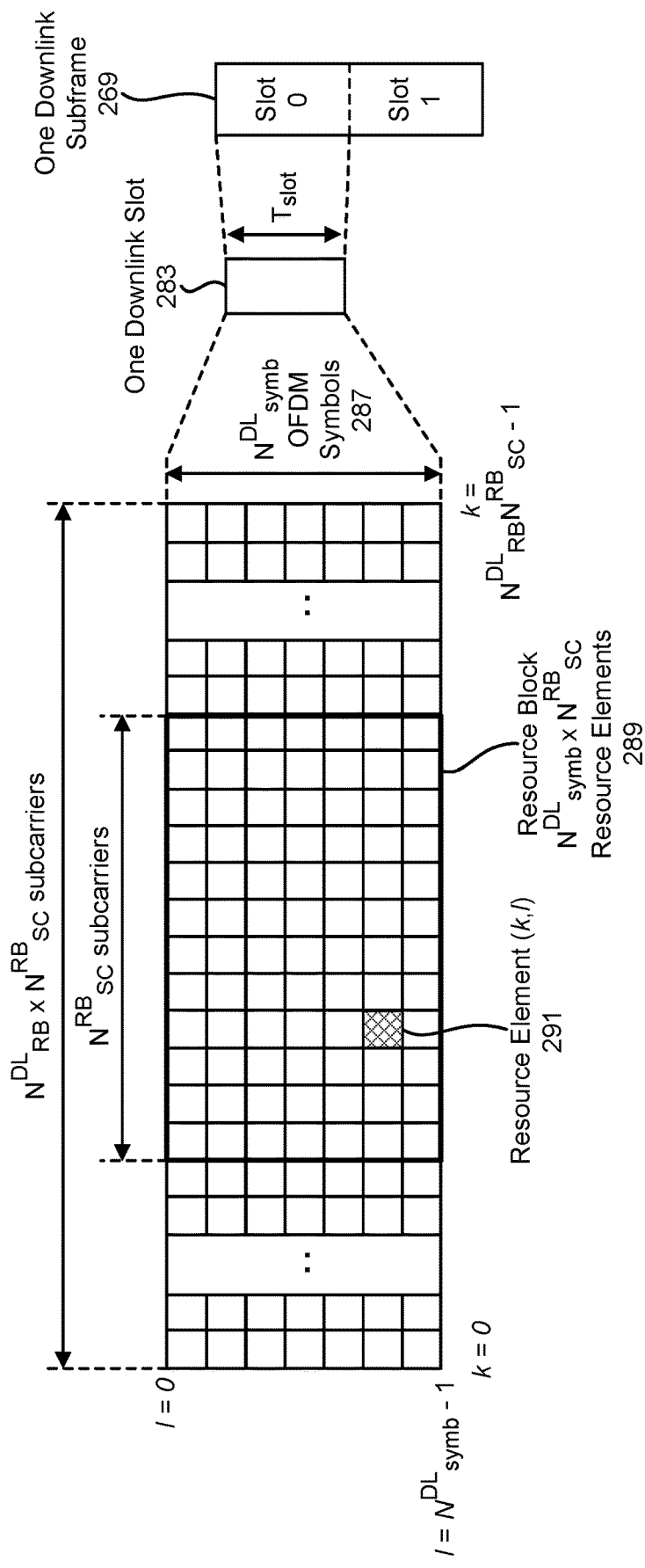
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
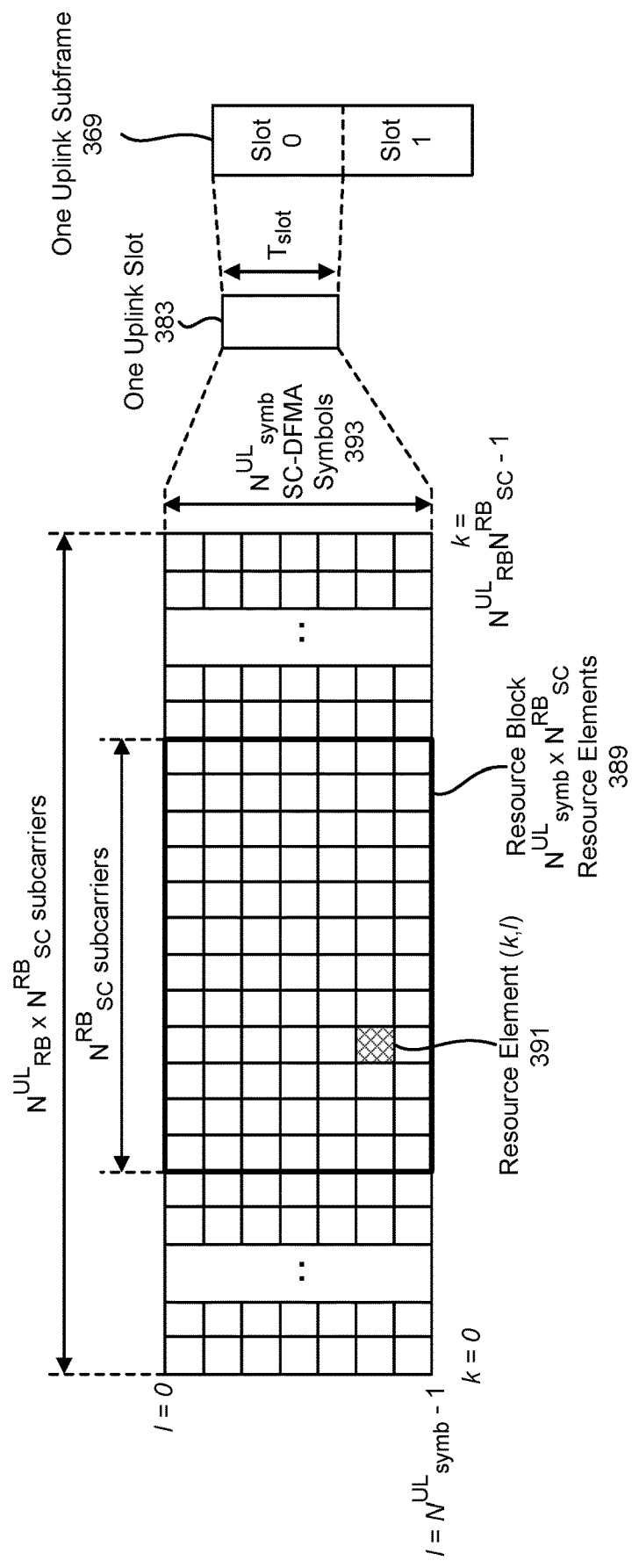
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-

OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
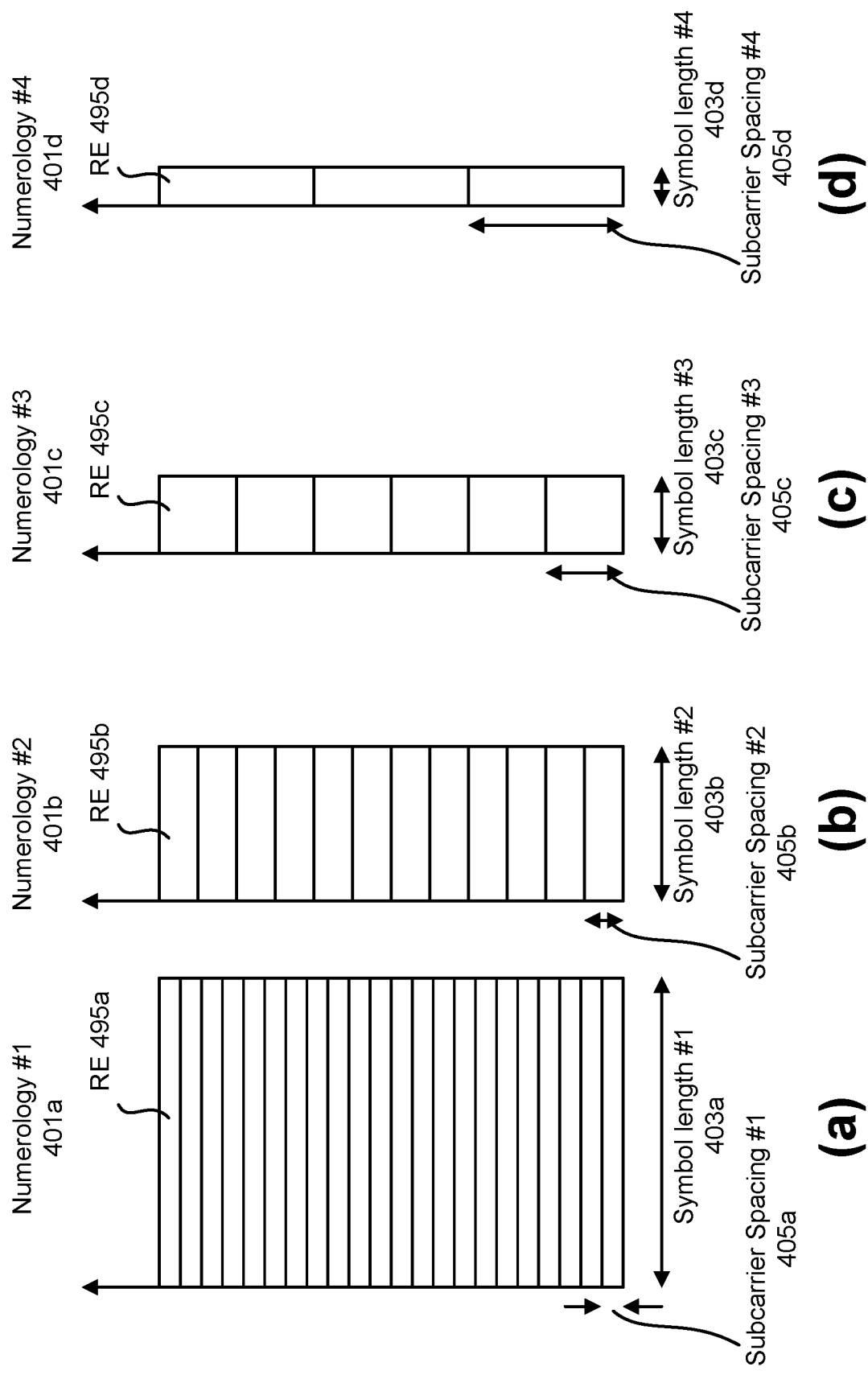
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
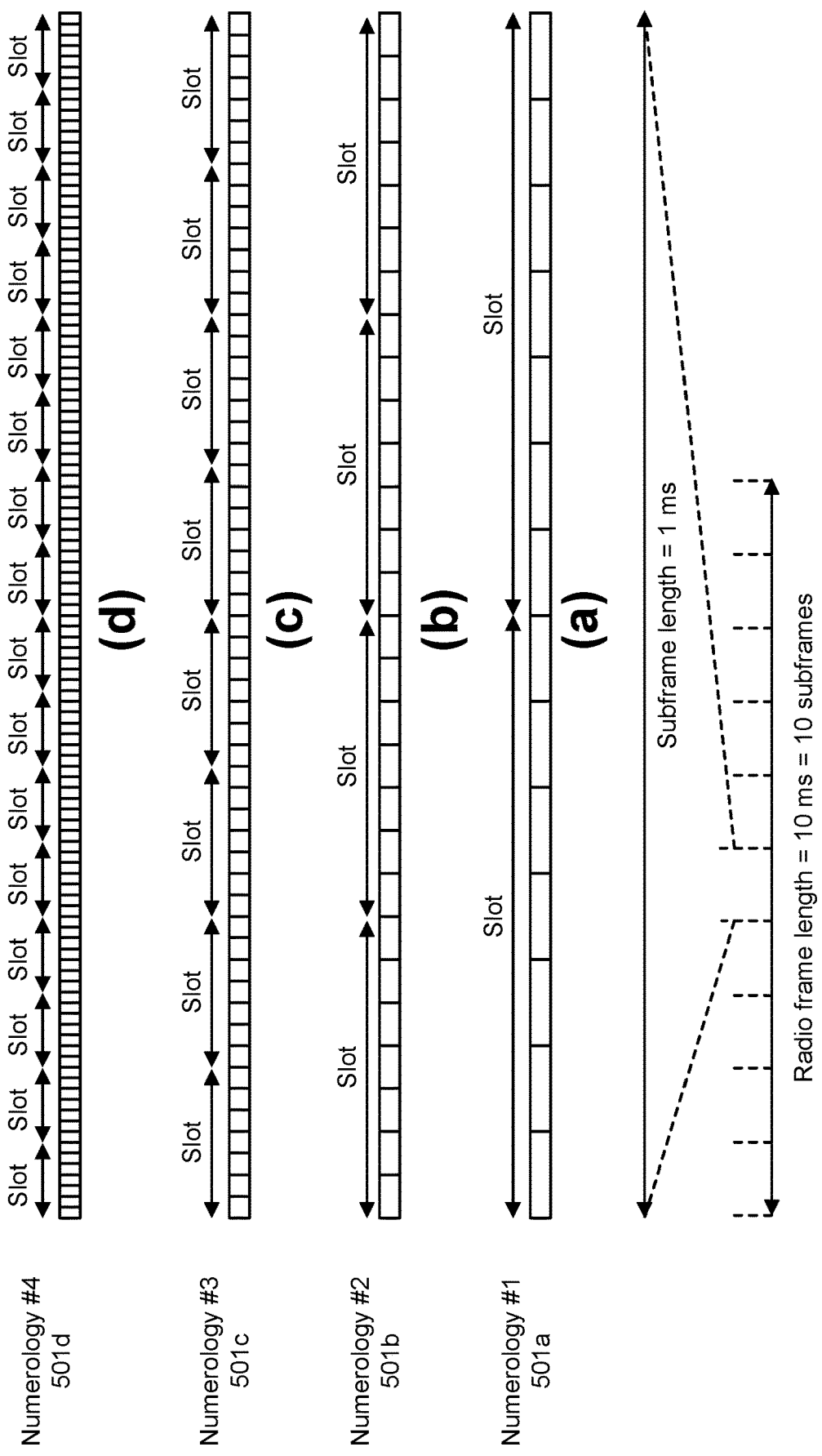
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
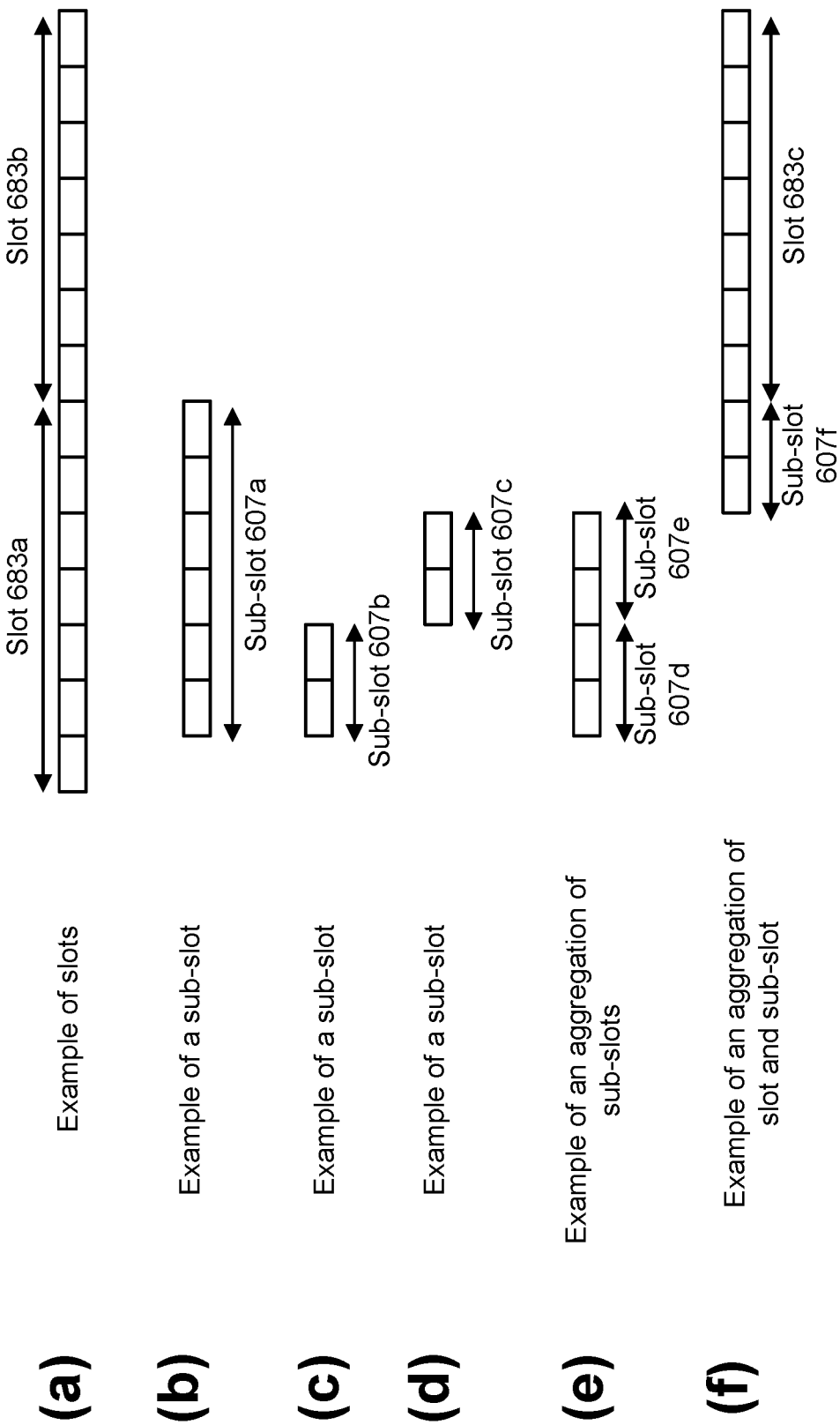
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$). Sub-slot may also be named as mini-slot.

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
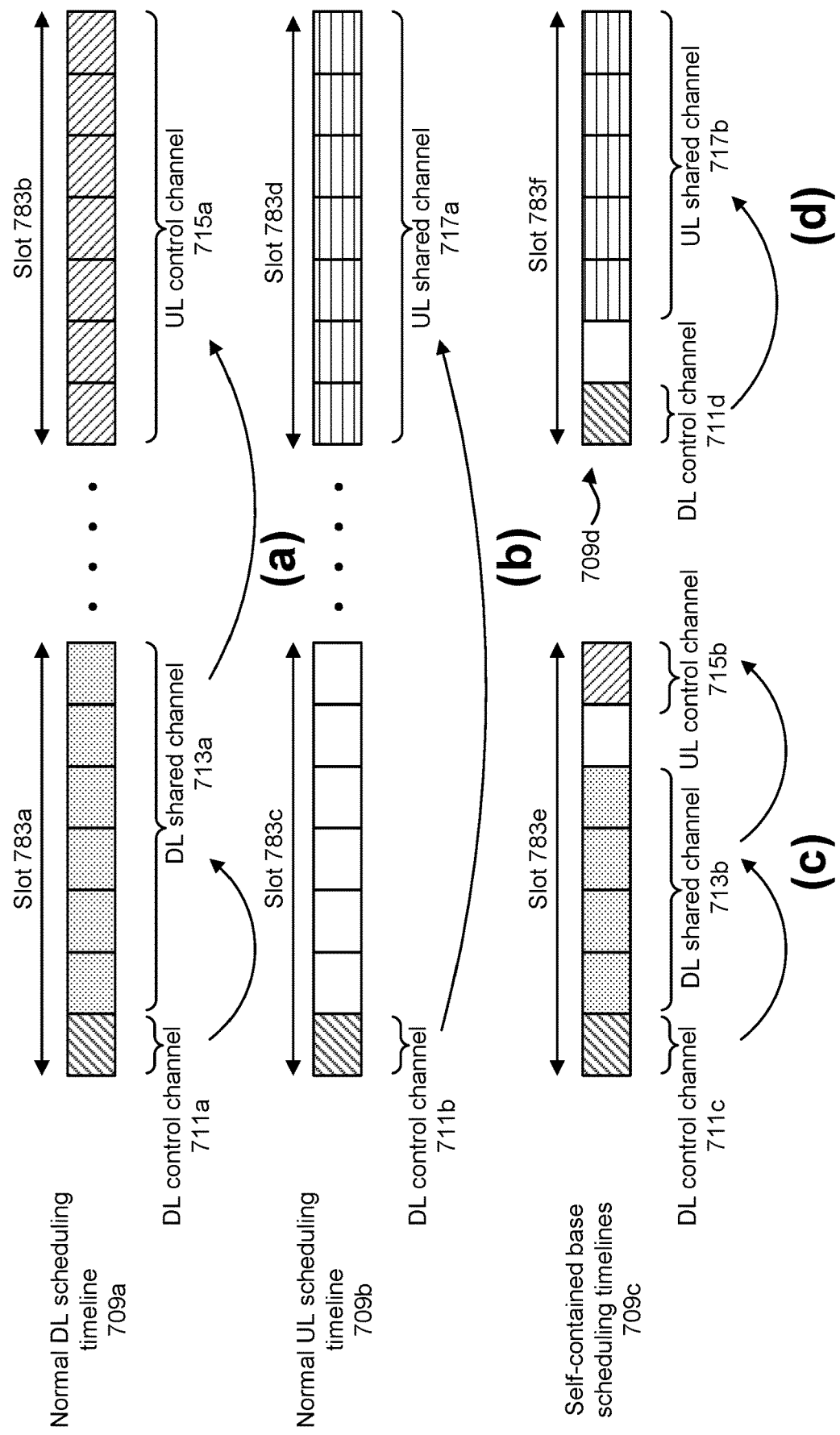
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported. The UE 102 may monitor a set of candidates of the DL control channel(s) in the control resource set (e.g., the CORESET). Here, the candidates of DL control channel (s) may be candidates for which the DL control channel(s) may possibly be mapped, assigned, and/or transmitted. For example, a candidate of the DL control channel(s) is composed of one or more control channel elements (CCEs). Here, the term "monitor" means that the UE 102 attempts to decode each DL control channel(s) in the set of candidates of the DL control channel(s) in accordance with all the DCI format(s) to be monitored. Namely, the UE 102 may decode the DCI format(s) (e.g., the PDCCH) based on the number of bits of information (e.g., information fields) included in the DCI format(s). Namely, the UE 102 may decode the DCI format(s) (e.g., the PDCCH) based on the number of bits of information (e.g., information fields) including the time domain RA (e.g., the Time domain resource assignment field).

Figure 9:
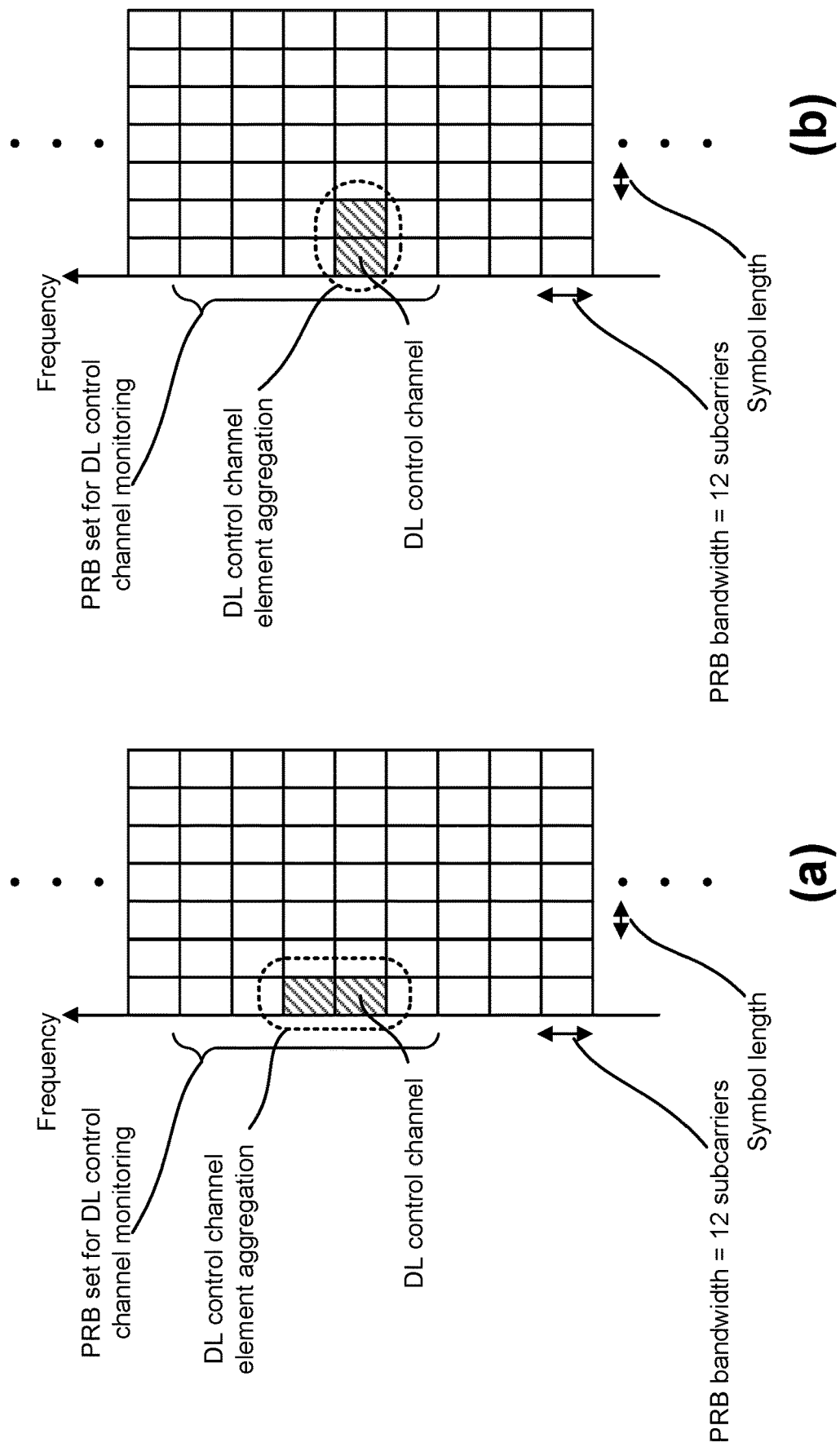
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
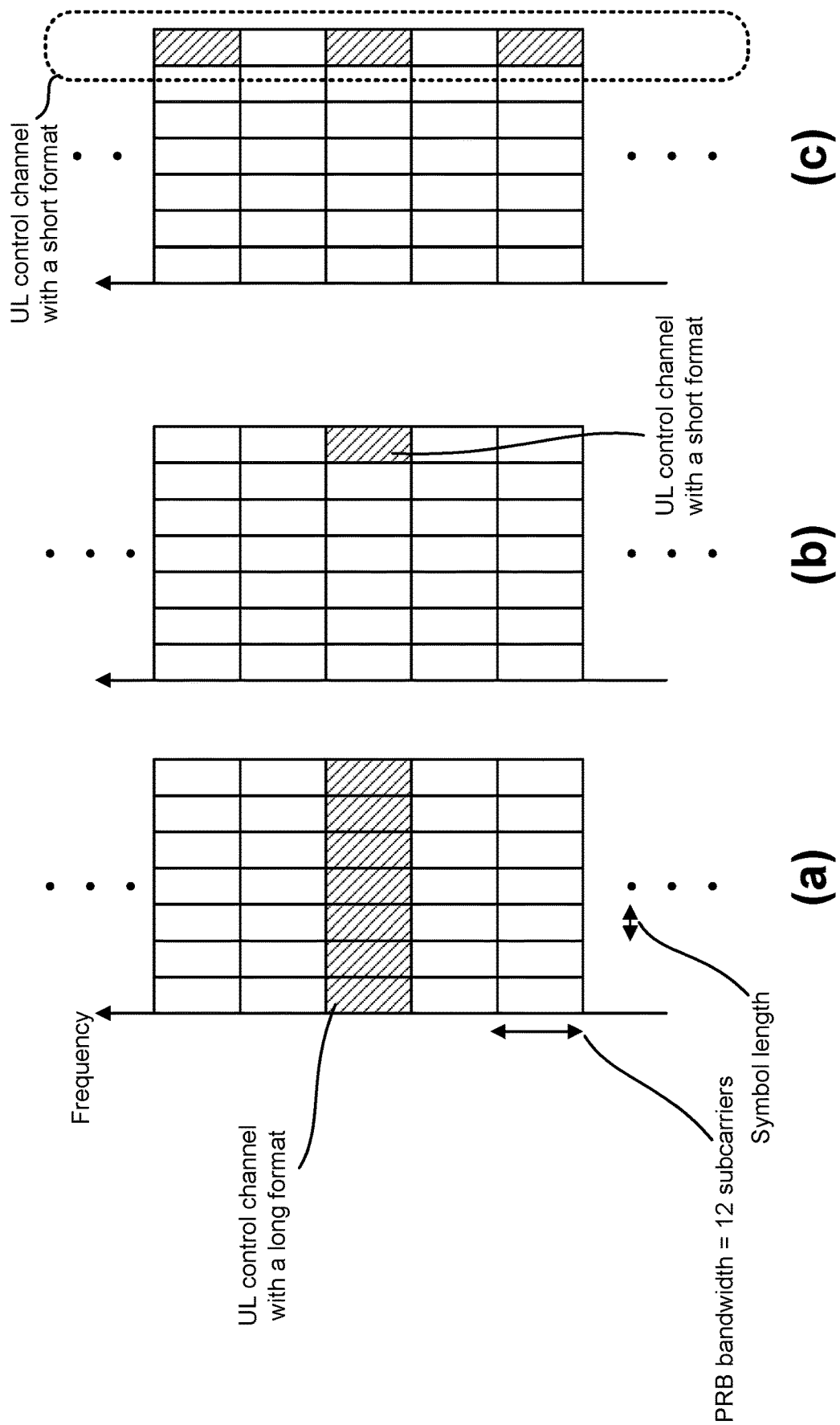
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g., 5 or 10) within a system bandwidth.

Figure 11:
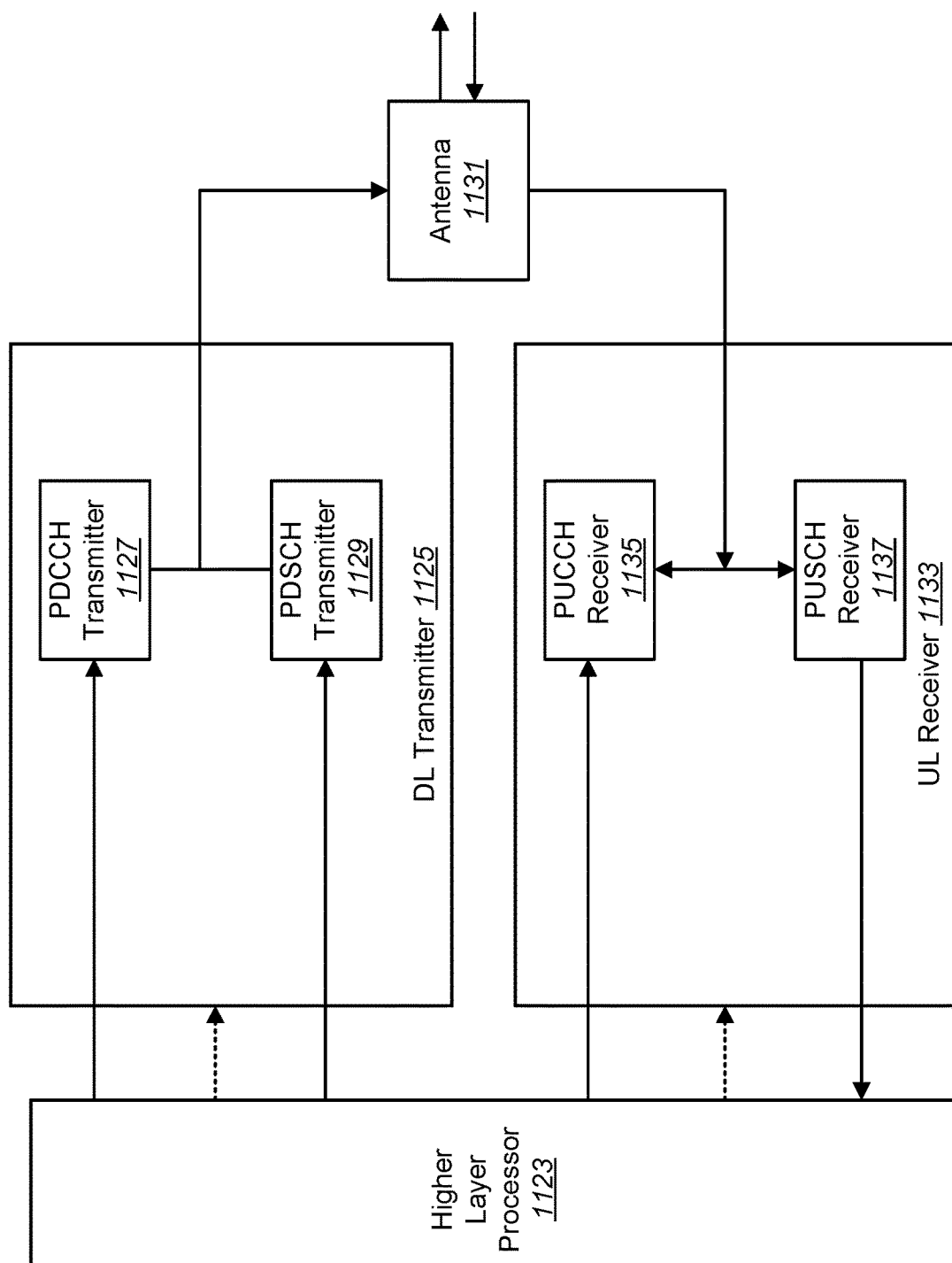
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 uplink control information (UCI). The PUSCH receiver 1137 may provide the higher layer processor 1123 received transport blocks.

Figure 12:
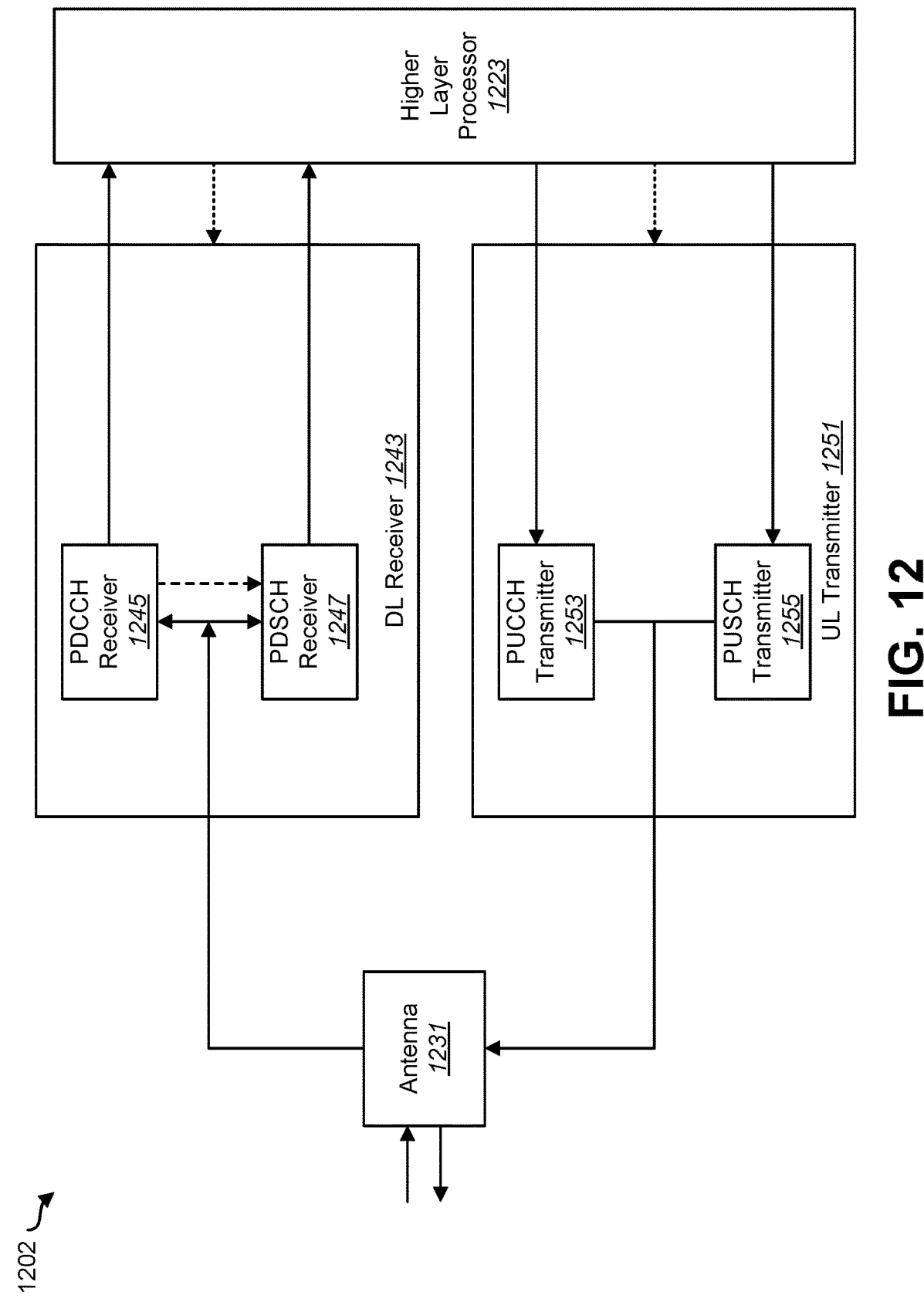
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
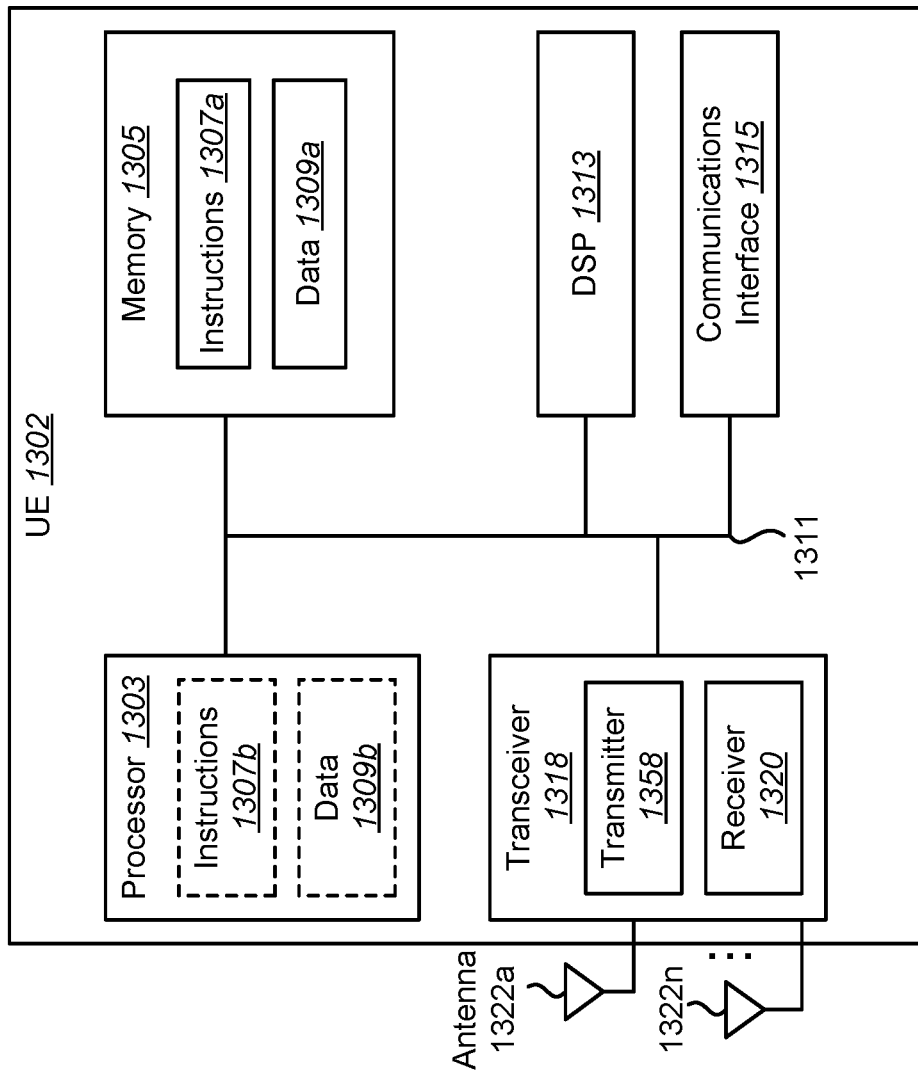
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
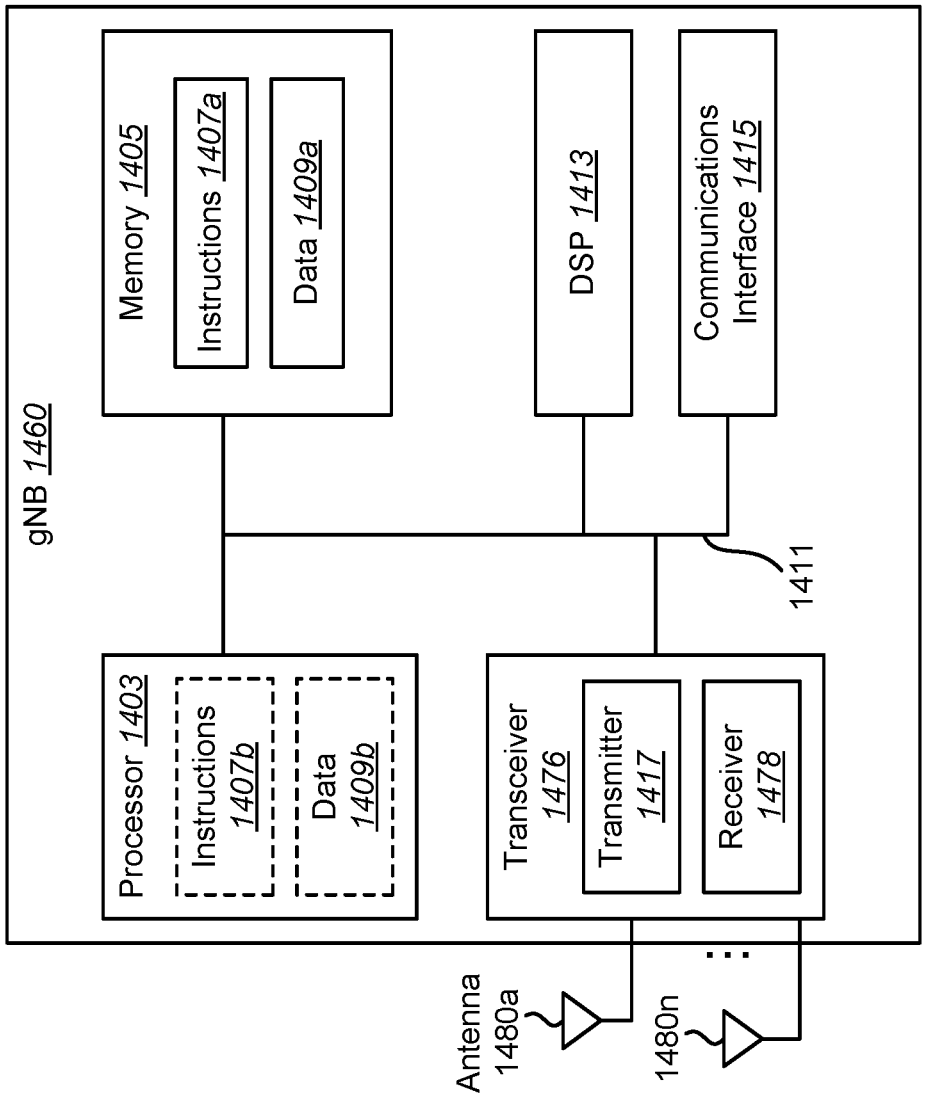
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
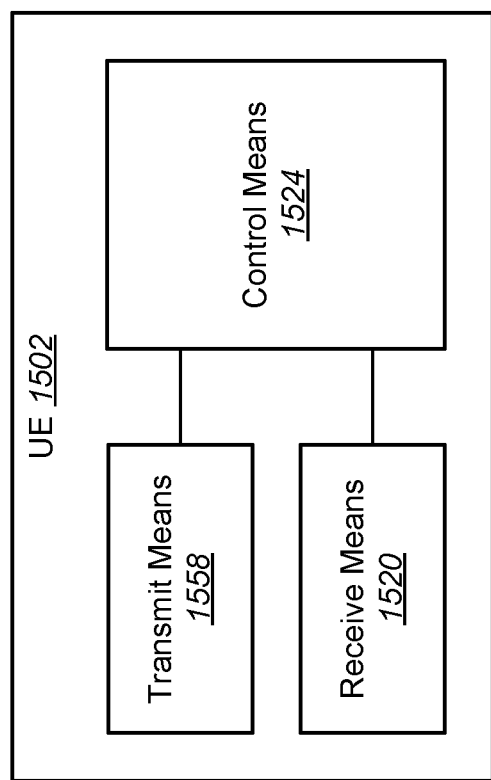
FIG. 15 is a block diagram illustrating one implementation of a UE in which systems and methods for time-domain resource allocation may be implemented.

FIG. 15 is a block diagram illustrating one implementation of a UE 1502 in which systems and methods for time-domain resource allocation may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
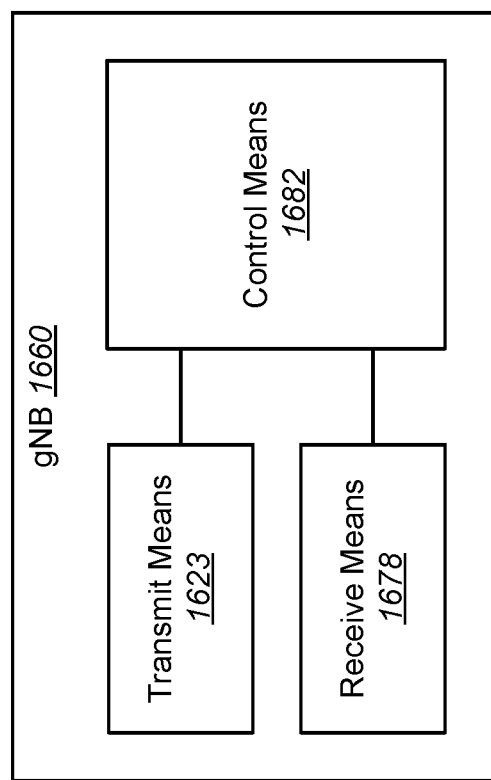
FIG. 16 is a block diagram illustrating one implementation of a gNB in which systems and methods for time-domain resource allocation may be implemented.

FIG. 16 is a block diagram illustrating one implementation of a gNB 1660 in which systems and methods for time-domain resource allocation may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
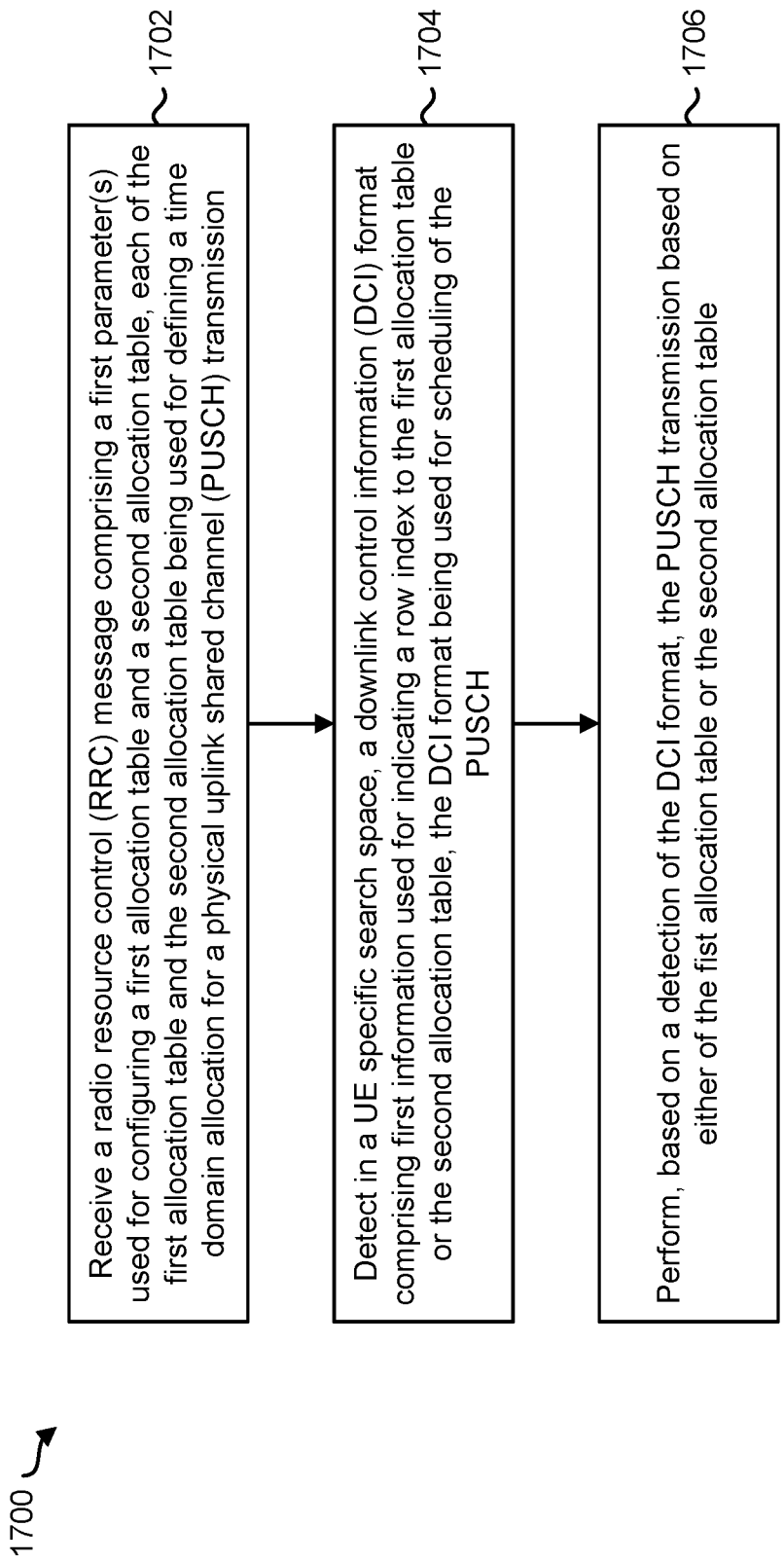
FIG. 17 is a flow diagram illustrating a communication method of a user equipment (UE)

FIG. 17 is a flow diagram illustrating a communication method 1700 of a user equipment (UE) 102. The communication method 1700 may include receiving 1702 a radio resource control (RRC) message comprising a first parameter(s) used for configuring a first allocation table and a second allocation table. Each of the first allocation table and the second allocation table may be used for defining a time domain allocation for a physical uplink shared channel (PUSCH) transmission. The communication method 1700 may also include detecting 1704 in a UE specific search space, a downlink control information (DCI) format comprising first information used for indicating a row index to the first allocation table or the second allocation table. The DCI format may be used for scheduling of the PUSCH. The communication method 1700 may also include performing 1706, based on a detection of the DCI format, the PUSCH transmission based on either of the first allocation table or the second allocation table. Whether the first allocation table or the second allocation table is used for the PUSCH transmission may be determined based on a radio network temporary identifier (RNTI) used for scrambling of cyclic redundancy check (CRC) for the DCI format.

Figure 18:
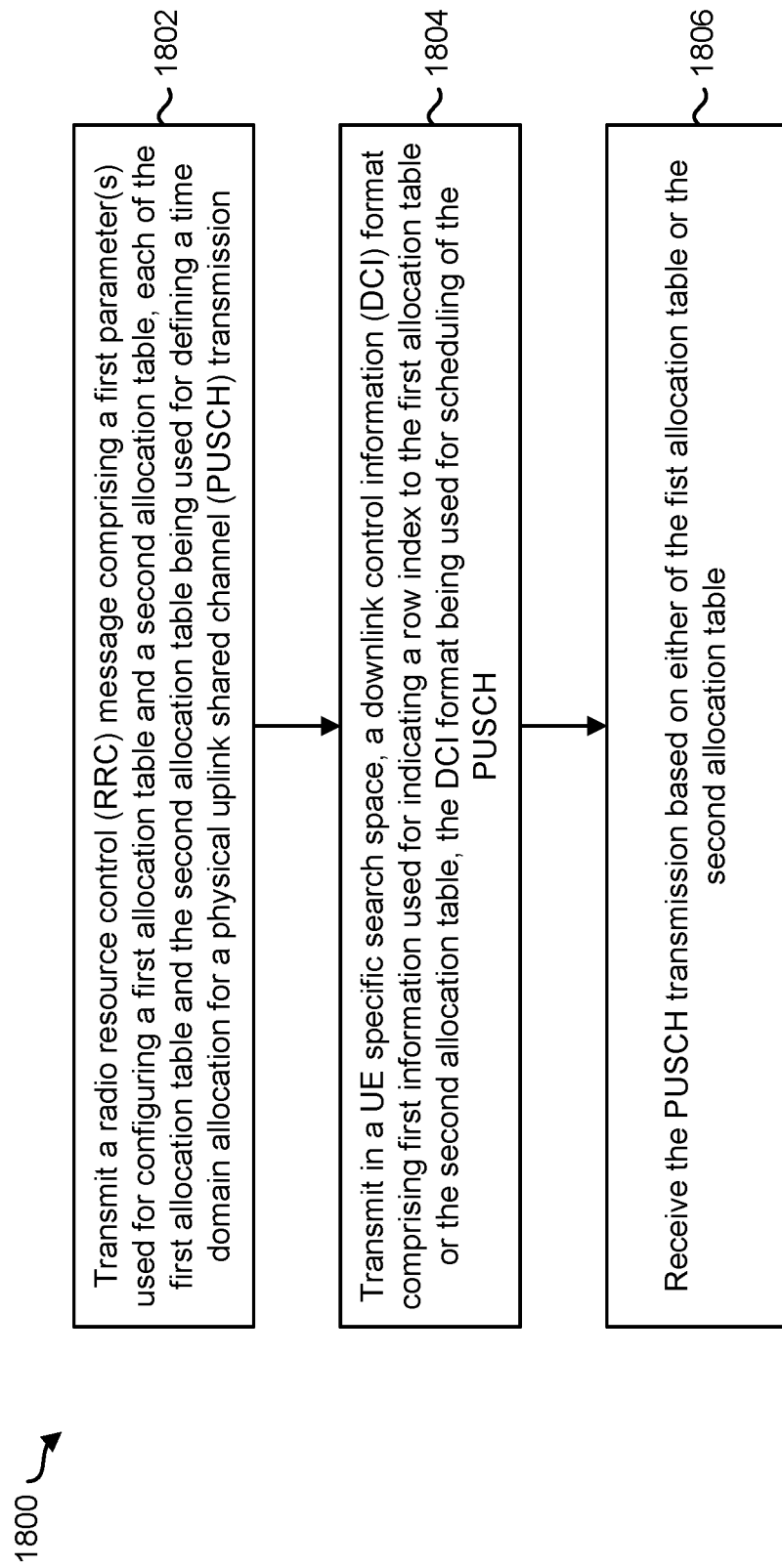
FIG. 18 is a flow diagram illustrating a communication method of a base station apparatus.

FIG. 18 is a flow diagram illustrating a communication method 1800 of a base station apparatus 160. The communication method 1800 may include transmitting 1802 a radio resource control (RRC) message comprising a first parameter(s) used for configuring a first allocation table and a second allocation table. Each of the first allocation table and the second allocation table may be used for defining a time domain allocation for a physical uplink shared channel (PUSCH) transmission. The communication method may also include transmitting 1804 in a UE specific search space, a downlink control information (DCI) format comprising first information used for indicating a row index to the first allocation table or the second allocation table. The DCI format may be used for scheduling of the PUSCH. The communication method may also include receiving 1806 the PUSCH transmission based on either of the first allocation table or the second allocation table. Whether the first allocation table or the second allocation table is used for the PUSCH transmission may be determined based on a radio network temporary identifier (RNTI) used for scrambling of cyclic redundancy check (CRC) for the DCI format.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE) comprising:
receiving circuitry configured to receive a radio resource control (RRC) message comprising a first parameter(s) used for configuring a first allocation table and a second allocation table, each of the first allocation table and the second allocation table being used for defining a time domain allocation for a physical uplink shared channel (PUSCH) transmission, wherein the first allocation table includes no more than 16 rows and the second allocation table includes up to 64 rows,
the receiving circuitry configured to detect in a UE specific search space, a first downlink control information (DCI) format comprising first information used for indicating a row index to the first allocation table and a second DCI format comprising second information used for indicating a row index to the second allocation table, the first DCI format or the second DCI format being used for scheduling of the PUSCH, wherein the first information includes 4 bits and the second information includes up to 6 bits, and
transmitting circuitry configured to perform, based on a detection of the first DCI format or the second DCI format, the PUSCH transmission based on either of the first allocation table or the second allocation table, wherein
in a first case where the first DCI format is detected, the first allocation table used for the PUSCH transmission is determined,
in a second case where the second DCI format is detected, the second allocation table used for the PUSCH transmission is determined, and
the first DCI format is DCI format 0_0, and the second DCI format is not the DCI format 0_0.

2. A base station apparatus comprising:
transmitting circuitry configured to transmit a radio resource control (RRC) message comprising a first parameter(s) used for configuring a first allocation table and a second allocation table, each of the first allocation table and the second allocation table being used for defining a time domain allocation for a physical uplink shared channel (PUSCH) transmission, wherein the first allocation table includes no more than 16 rows and the second allocation table includes up to 64 rows,
the transmitting circuitry configured to transmit in a UE specific search space, a first downlink control information (DCI) format comprising first information used for indicating a row index to the first allocation table and a second DCI format comprising second information used for indicating a row index to the second allocation table, the first DCI format or the second DCI format being used for scheduling of the PUSCH, wherein the first information includes 4 bits and the second information includes up to 6 bits, and
receiving circuitry configured to receive the PUSCH transmission based on either of the first allocation table or the second allocation table, wherein
in a first case where the first DCI format is detected, the first allocation table used for the PUSCH transmission is determined,
in a second case where the second DCI format is detected, the second allocation table used for the PUSCH transmission is determined, and
the first DCI format is DCI format 0_0, and the second DCI format is not the DCI format 0_0.

3. A communication method of a user equipment (UE) comprising:
receiving a radio resource control (RRC) message comprising a first parameter(s) used for configuring a first allocation table and a second allocation table, each of the first allocation table and the second allocation table being used for defining a time domain allocation for a physical uplink shared channel (PUSCH) transmission, wherein the first allocation table includes no more than 16 rows and the second allocation table includes up to 64 rows,
detecting in a UE specific search space, a first downlink control information (DCI) comprising first information used for indicating a row index to the first allocation table format or a second DCI format comprising second information used for indicating a row index to the second allocation table, the first DCI format or the second DCI format being used for scheduling of the PUSCH, wherein the first information includes 4 bits and the second information includes up to 6 bits, and
performing, based on a detection of the first DCI format or the second DCI format, the PUSCH transmission based on either of the first allocation table or the second allocation table, wherein
in a first case where the first DCI format is detected, the first allocation table used for the PUSCH transmission is determined,
in a second case where the second DCI format is detected, the second allocation table used for the PUSCH transmission is determined, and
the first DCI format is DCI format 0_0, and the second DCI format is not the DCI format 0_0.

4. A communication method of a base station apparatus comprising:
transmitting a radio resource control (RRC) message comprising a first parameter(s) used for configuring a first allocation table and a second allocation table, each of the first allocation table and the second allocation table being used for defining a time domain allocation for a physical uplink shared channel (PUSCH) transmission, wherein the first allocation table includes no more than 16 rows and the second allocation table includes up to 64 rows,
transmitting in a UE specific search space, a first downlink control information (DCI) format comprising first information used for indicating a row index to the first allocation table or a second DCI format comprising second information used for indicating a row index to the second allocation table, the first DCI format or the second DCI format being used for scheduling of the PUSCH, wherein the first information includes 4 bits and the second information includes up to 6 bits, and
receiving the PUSCH transmission based on either of the first allocation table or the second allocation table, wherein
in a first case where the first DCI format is detected, the first allocation table used for the PUSCH transmission is determined, in a second case where the second DCI format is detected, the second allocation table used for the PUSCH transmission is determined, and the first DCI format is DCI format 0_0, and the second DCI format is not the DCI format 0_0.

\* \* \* \* \*